United States Patent
Hayashi

(10) Patent No.: US 10,957,003 B2
(45) Date of Patent: Mar. 23, 2021

(54) IMAGING APPARATUS, PRODUCTION SYSTEM, IMAGING METHOD, PROGRAM, AND RECORDING MEDIUM

(71) Applicant: CANON KABUSHIKI KAISHA, Tokyo (JP)

(72) Inventor: Tadashi Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 15/767,877

(22) PCT Filed: Oct. 7, 2016

(86) PCT No.: PCT/JP2016/080634
§ 371 (c)(1),
(2) Date: Apr. 12, 2018

(87) PCT Pub. No.: WO2017/065308
PCT Pub. Date: Apr. 20, 2017

(65) Prior Publication Data
US 2018/0308192 A1    Oct. 25, 2018

(30) Foreign Application Priority Data

Oct. 13, 2015   (JP) .............................. JP2015-201855

(51) Int. Cl.
*G06K 9/00*     (2006.01)
*G06T 1/00*     (2006.01)
(Continued)

(52) U.S. Cl.
CPC ........... *G06T 1/0014* (2013.01); *B25J 9/1697* (2013.01); *G01B 11/002* (2013.01); *G06T 7/11* (2017.01);
(Continued)

(58) Field of Classification Search
CPC ................ A61M 5/165; A61M 5/3145; A61M 2005/1655; A61M 2205/75; A61M 5/3297; A61M 5/38; A61M 5/178
See application file for complete search history.

(56) References Cited

U.S. PATENT DOCUMENTS

| 5,305,122 A | 4/1994 | Hayashi et al. |
| 5,987,166 A | 11/1999 | Hayashi et al. |

(Continued)

FOREIGN PATENT DOCUMENTS

| DE | 102008042260 A1 | 4/2010 |
| JP | 11-346094 | 12/1999 |

(Continued)

OTHER PUBLICATIONS

Bosch Robert (DE 10 2008 042260 "Method for handling three-dimensional object in industrial robot system, performs providing multiple cameras with structured light eg LED, and homogenous light for obtaining individual measurements"). (Year: 2010).*

(Continued)

*Primary Examiner* — Solomon G Bezuayehu
(74) *Attorney, Agent, or Firm* — Venable LLP

(57) ABSTRACT

An imaging apparatus includes an imaging unit to image an object, an illuminating unit to irradiate light to the object, the illuminating unit having a first light source and a second light source, and a controlling unit. The controlling unit executes a first imaging process for obtaining a first image acquired by imaging, by repetitively executing an imaging operation by imaging the object in a state in which the first light source is off and the second light source is on, during conveyance of the object, a second imaging process for obtaining a second image by imaging the object in a state in which the first light source is on during the conveyance of the object, and a changing-over process for setting a timing for switching from the first imaging process to the second (Continued)

imaging process, on the basis of the first image acquired by imaging.

17 Claims, 15 Drawing Sheets

(51) Int. Cl.
  *B25J 9/16* (2006.01)
  *G01B 11/00* (2006.01)
  *G06T 7/73* (2017.01)
  *G06T 7/11* (2017.01)
  *G06T 7/70* (2017.01)

(52) U.S. Cl.
  CPC .................. *G06T 7/70* (2017.01); *G06T 7/74* (2017.01); *G06T 2207/10152* (2013.01); *G06T 2207/30164* (2013.01); *G06T 2207/30204* (2013.01)

(56) References Cited

U.S. PATENT DOCUMENTS

| | | | |
|---|---|---|---|
| 6,201,616 B1 | 3/2001 | Sasanuma et al. | |
| 6,594,600 B1 * | 7/2003 | Arnoul | G01B 11/2755 382/154 |
| 6,987,875 B1 * | 1/2006 | Wallack | G06T 7/0008 348/125 |
| 8,319,831 B2 | 11/2012 | Koike et al. | |
| 10,098,204 B1 * | 10/2018 | Byers | H05B 47/105 |
| 10,616,980 B1 * | 4/2020 | Valder | H05B 47/19 |
| 2006/0067572 A1 * | 3/2006 | White | G06K 9/2036 382/152 |
| 2007/0260419 A1 * | 11/2007 | Hagiwara | G03F 7/70358 702/150 |
| 2010/0246895 A1 | 9/2010 | Koike et al. | |
| 2012/0013530 A1 * | 1/2012 | Tsuboi | G02B 27/2214 345/157 |
| 2013/0182903 A1 * | 7/2013 | Nammoto | G06K 9/00664 382/103 |
| 2014/0201094 A1 * | 7/2014 | Herrington | G06K 9/00577 705/317 |
| 2017/0031435 A1 * | 2/2017 | Raffle | G02B 27/0172 |
| 2019/0259260 A1 * | 8/2019 | Amini | G07C 9/37 |

FOREIGN PATENT DOCUMENTS

| | | |
|---|---|---|
| JP | 2002-187025 | 7/2002 |
| JP | 2010-221381 A | 10/2010 |

OTHER PUBLICATIONS

International Search Reporting and Written Opinion dated Jan. 19, 2017, issued in corresponding International Application No. PCT/JP2016/080634.

International Preliminary Report on Patentability dated Apr. 26, 2018, in International Application No. PCT/JP2016/080634.

* cited by examiner

IMAGING APPARATUS, PRODUCTION SYSTEM, IMAGING METHOD, PROGRAM, AND RECORDING MEDIUM

This application is a U.S. national stage application of PCT International Application No. PCT/JP2016/080634, filed Oct. 7, 2016, that claims priority from Japanese Patent Application No. 2015-201855, filed Oct. 13, 2015.

TECHNICAL FIELD

The invention relates to an imaging apparatus for automatically imaging a work which is conveyed by a conveying apparatus, a production system, an imaging method, a program, and a recording medium.

BACKGROUND ART

Generally, there is a conveying apparatus for conveying an object (work) by using a robot, a belt conveyor, or the like. In many cases, the work is conveyed in a state where there are variations in a position and an orientation to the conveying apparatus. Generally, after completion of the conveyance, a position and an orientation of the work are measured at a place in front of the working position, the position and orientation of the work are properly corrected, and, thereafter, a working operation is started. Also, in an inspection of the work, generally, after the position and orientation of the work were corrected, the work is conveyed to a station for exclusively performing the inspection and, subsequently, the inspection is performed. That is, in a production system, it is necessary to measure a state of the work such as position and orientation of the work, a defect in the work, and the like.

Japanese Patent Application Laid-Open No. 2010-221381 discloses such a technique that a mark, such as an LED, a retroreflective member, or the like, is put onto an assembling pallet on which a work is mounted and the mark is imaged by a camera, thereby obtaining a position and an orientation of the assembling pallet and obtaining a position and an orientation of the work.

SUMMARY OF INVENTION

Technical Problem

However, according to the technique disclosed in Japanese Patent Application Laid-Open No. 2010-221381, although a position and an orientation of a conveying apparatus such as an assembling pallet, or the like, can be obtained, in order to obtain the position and orientation of the work conveyed to the conveying apparatus, such a condition that the work has accurately been positioned to the conveying apparatus is necessary as a prerequisite. Therefore, the technique disclosed in Japanese Patent Application Laid-Open No. 2010-221381 is not made by presuming a case when the work is conveyed to the conveying apparatus in a state of an arbitrary position and orientation. That is, Japanese Patent Application Laid-Open No. 2010-221381 discloses such a technique that the mark such as an LED, a retroreflective member, or the like, is imaged by the camera and the position and orientation of the work positioned onto the assembling pallet are indirectly obtained from the position and orientation of the mark.

On the other hand, a method whereby a work conveyed to a conveying apparatus is imaged by using a camera and a state such as position, orientation, defect, and the like, of the work is directly measured from the image acquired by imaging is considered. By analyzing the image that was acquired by imaging and to which the work was projected, the state of the work can be measured. In order to accurately extract information from the image acquired by imaging the work, it is necessary to set a large resolution (the number of pixels).

In Japanese Patent Application Laid-Open No. 2010-221381, after the assembling pallet was temporarily stopped, the work is imaged by the camera. However, in recent years, in order to shorten a time that is required to image, such a technique that the work is imaged while conveying the work is required.

As for a work that moves at a high speed, in order to prevent a blurring in an image that was acquired by imaging and is used to measure a state of the work, a high shutter speed and a strong illumination are necessary. In such a situation, a range of an optimum imaging condition is narrow and a result of the imaging varies largely in dependence on an exposing condition and a surface state of the work. Therefore, it is necessary that an illuminating condition at the time of imaging the work is finely set in accordance with the work.

On the other hand, in order to image the work while conveying the work, a timing for imaging the work is important and such imaging timing has to be accurately obtained. For this purpose, a method whereby, before an image acquired by imaging for measurement that is actually necessary is obtained, images acquired by imaging that are necessary to detect the imaging timing are continuously obtained, and the imaging timing of the work is detected from those images acquired by imaging is considered. At this time, in the case of detecting the imaging timing in a state when the work has been conveyed at a high speed, a high frame rate is necessary.

However, if an illuminance is raised in accordance with the illuminating condition at the time of imaging the whole work, even in the image acquired by imaging at the time of detecting the imaging timing, a background is projected and it is necessary to separate the background. Therefore, an arithmetic operation load increases and an operating speed decreases. In other words, when the imaging timing of the work is detected, if it is intended to image the work under the same illuminating condition as that adapted to image the work, the arithmetic operation load increases. Thus, it takes a long time to detect the imaging timing and the frame rate cannot be raised. Consequently, a conveying speed of the work cannot help being decreased.

It is, therefore, an aspect of the invention to certainly image a work while conveying the work at a high speed.

Solution to Problem

According to an aspect of the invention, an imaging apparatus comprises an imaging unit configured to image an object, an illuminating unit configured to irradiate light to the object, and a controlling unit configured to control the imaging unit and the illuminating unit, wherein the illuminating unit has a first light source having a certain opening and a second light source having an opening smaller than that of the first light source, and the controlling unit executes a first imaging process for obtaining a first image acquired by imaging by repetitively executing an imaging operation for allowing the imaging unit to image the object in a state when the first light source is lit off and the second light source is lit on during the conveyance of the object by a conveying apparatus, a second imaging process for obtaining a second image acquired by imaging by allowing the imaging unit to image the object in a state when the first light source is lit on during the conveyance of the object by the conveying apparatus, and a changing-over process for setting timing for switching from the first imaging process to the second imaging process on the basis of the first image acquired by imaging.

Advantageous Effects of Invention

According to an aspect of the invention, by using the second light source, a frame rate is raised and the image that was acquired by imaging and to which the reflected light from the mark was projected can be obtained, so that the moving work can be imaged at the set timing under the light illumination by the first light source. Therefore, the work can be certainly imaged while conveying the work at a high speed.

Further features of the present invention will become apparent from the following description of exemplary embodiments with reference to the attached drawings.

DESCRIPTION OF EMBODIMENTS

Modes for embodying the invention will be described in detail below with reference to the drawings.

First Embodiment

Figure 1:
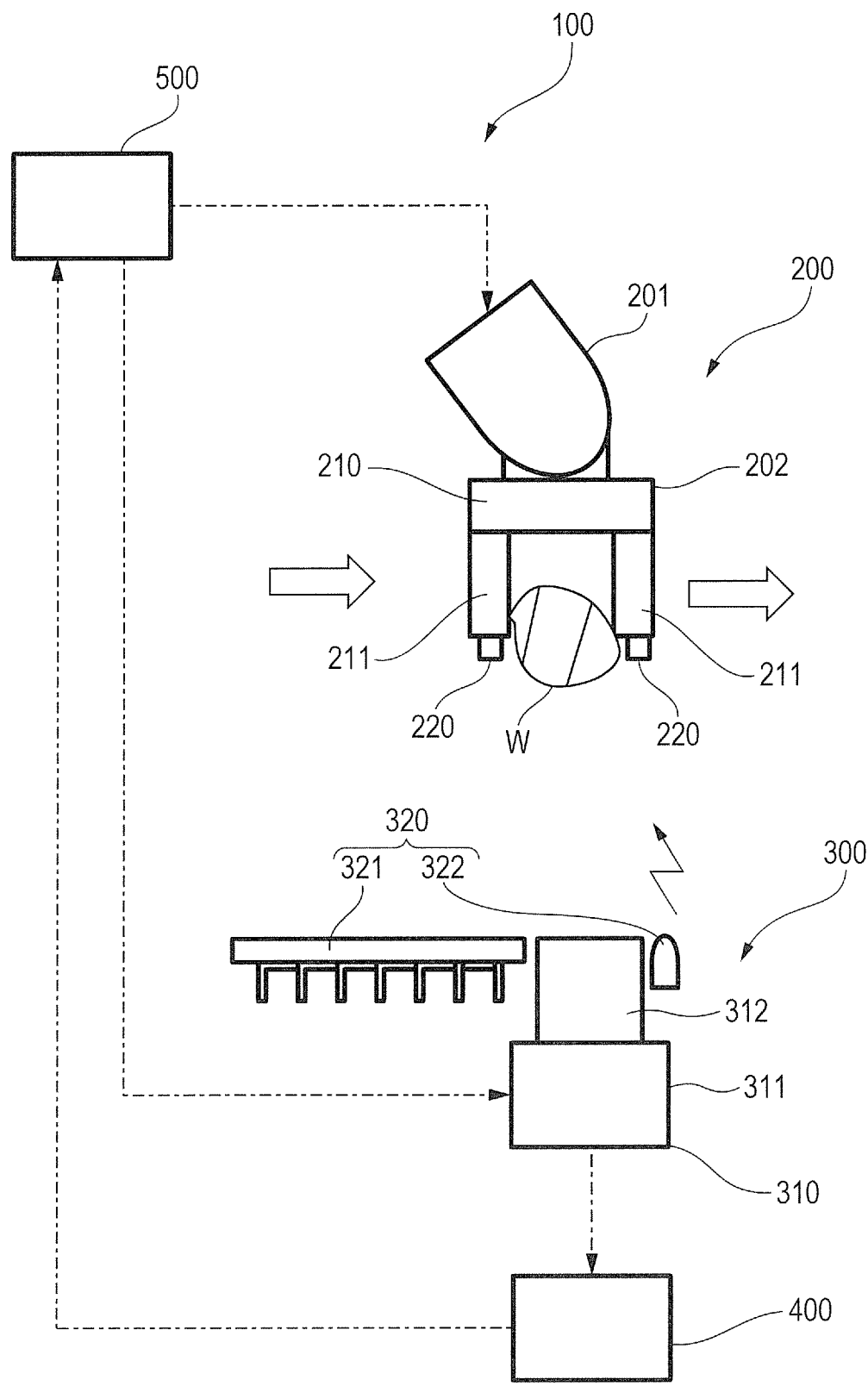
FIG. 1 is a diagram illustrating a schematic construction of a production system according to the first embodiment.

FIG. 1 is a diagram illustrating a schematic construction of a production system according to the first embodiment. A production system 100 has a robot 200 as a conveying apparatus for conveying a work W, a camera 300 as an imaging apparatus, an image processing apparatus 400 and a robot controlling apparatus 500.

The robot 200 holds the work W and conveys the work W. The robot 200 has a robot arm 201 (only a tip portion of the robot arm 201 is illustrated in FIG. 1) and a robot hand 202 attached to the tip of the robot arm 201. Although the robot arm 201 is a vertical multi-joint type in the embodiment, it may be any one of robot arms such as a robot arm of a horizontal multi-joint type, a robot arm of a parallel link type, an orthogonal robot, and the like. The conveying apparatus is not limited to the robot 200, but may be a uniaxial conveyer. In addition, a driving method of the conveying apparatus is not limited to a driving method of an electric motor type but may be a driving method by a pneumatic method, a hydraulic method, a spring method, or human power.

The robot hand 202 has a hand main body 210, and a plurality of (for example, 3) fingers 211 supported to the hand main body 210. The robot hand 202 can grasp the work W by the plurality of fingers 211. A construction of the robot hand 202 is not limited to such a construction, but it is sufficient that the work W can be grasped and, for example, it may be an adsorption type.

The camera 300 is an apparatus that automatically images the work W serving as a target of an inspection measurement. The image processing apparatus 400 measures a state of the work W by using the image acquired by imaging from the camera 300. The embodiment will be described with respect to a case when the image processing apparatus 400 obtains a position and an orientation of the work W as a state of the work W from the image acquired by imaging. However, the invention can be also applied to a case of detecting a defect, or the like, of the work W.

Orbit data of the robot 200 has been programmed in the robot controlling apparatus 500 in such a manner that the work W passes through a range of capable of imaging of the camera 300 while the robot 200 is conveying the work W.

The robot controlling apparatus 500 obtains an image processing result from the image processing apparatus 400, that is, data of the position and orientation of the work W to the robot 200. After the work W passed through the range of capable of imaging of the camera 300, the robot controlling apparatus 500 corrects the orientation of the robot 200 on the basis of the data of the position and orientation. Thus, the robot controlling apparatus 500 corrects the position and orientation of the work W and allows the robot 200 to execute another operation, for example, an operation to assemble the work W to another work. When the robot controlling apparatus 500 allows the robot 200 to execute the operation for conveying the work W, a signal showing that the work W is being conveyed is output to the camera 300.

A mark adapted to reflect light, specifically speaking, a retroreflective member 220 as a member having a retroreflective property is provided for the robot 200 or the work W. In the embodiment, the retroreflective member 220 is provided for the robot 200. Therefore, in the embodiment, there is no need to add the mark to all of the works W.

The retroreflective member 220 is provided for the robot hand 202 so that the work W can be imaged by the camera 300 irrespective of a grasping state of the work W. When describing in more detail, the retroreflective member 220 is attached to a tip of the finger 211 of the robot hand 202. In the embodiment, the retroreflective member 220 is provided for each of the plurality of fingers 211. That is, the plurality of retroreflective members 220 are provided for the robot 200.

The camera 300 is constructed so as to have a camera main body 310 as an imaging unit and an illuminating unit 320. The camera main body 310 images the work W that is conveyed by the robot 200 and passes in the imaging range. The camera main body 310 has a casing 311 and a lens 312 attached to the casing 311.

The illuminating unit 320 is an apparatus for irradiating light to the work W that passes in the imaging range of the camera main body 310. The illuminating unit 320 has a light source 321 as a first light source and a light source 322 as a second light source. Both of the two light sources 321 and 322 are used to illuminate and to image. The light source 321 has an opening necessary to image the work W. The light source 322 has an opening smaller than that of the light source 321. The light source 322 is arranged near the camera main body 310. Thus, when the light irradiated from the light source 322 is reflected by the retroreflective member 220, it is again reflected (retroreflecting member) toward the light source 322. Since the light source 322 is arranged so as to be adjacent to the camera main body 310, the reflected light from the retroreflective member 220 enters the camera main body 310. The camera main body 310 and the light sources 321 and 322 are arranged so as to have a predetermined positional relation.

Figure 2A:
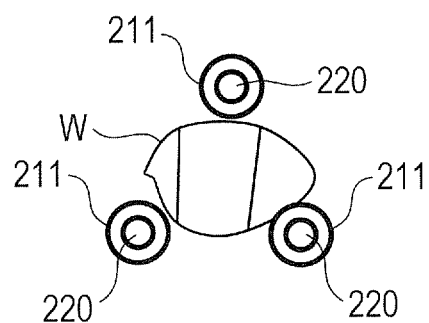
FIG. 2A is a plan view of a state when a work grasped by a robot hand is seen from the side of a camera.
Figure 2B:
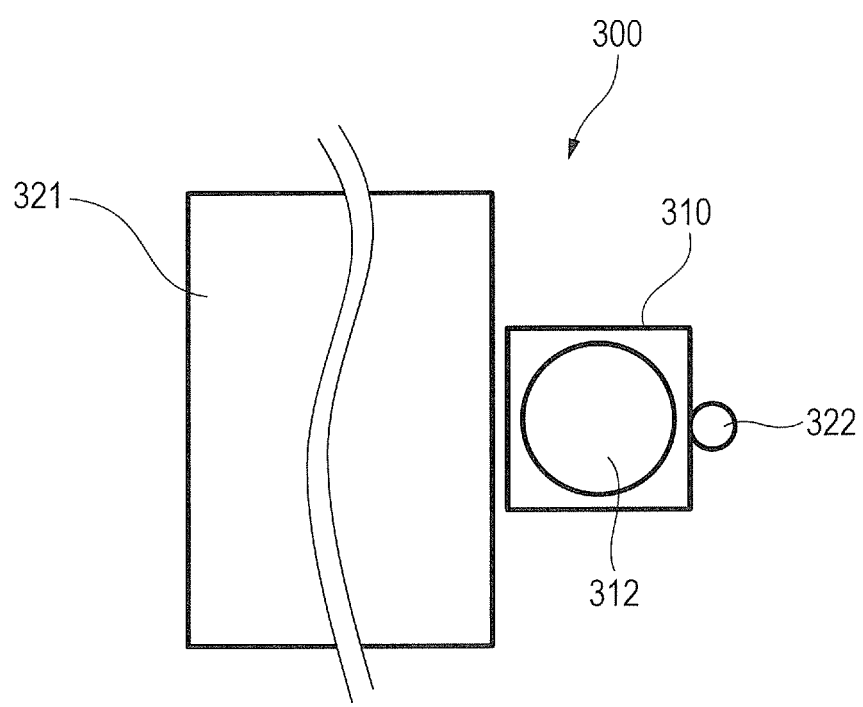
FIG. 2B is a plan view of a state when the camera is seen from the side of the work grasped by the robot hand.

FIG. 2A is a plan view of a state when the work W grasped by the robot hand 202 is seen from the side of the camera 300. As illustrated in FIG. 2B, all of the retroreflective members 220 are arranged so that they can be seen from the camera 300. FIG. 2B is a plan view of a state where the camera 300 is seen from the side of the work W grasped by the robot hand 202. As illustrated in FIG. 2B, the light sources 321 and 322 are arranged so as not to be masked by an obstacle when they are seen from the side of the robot hand 202 (work W).

Figure 3:
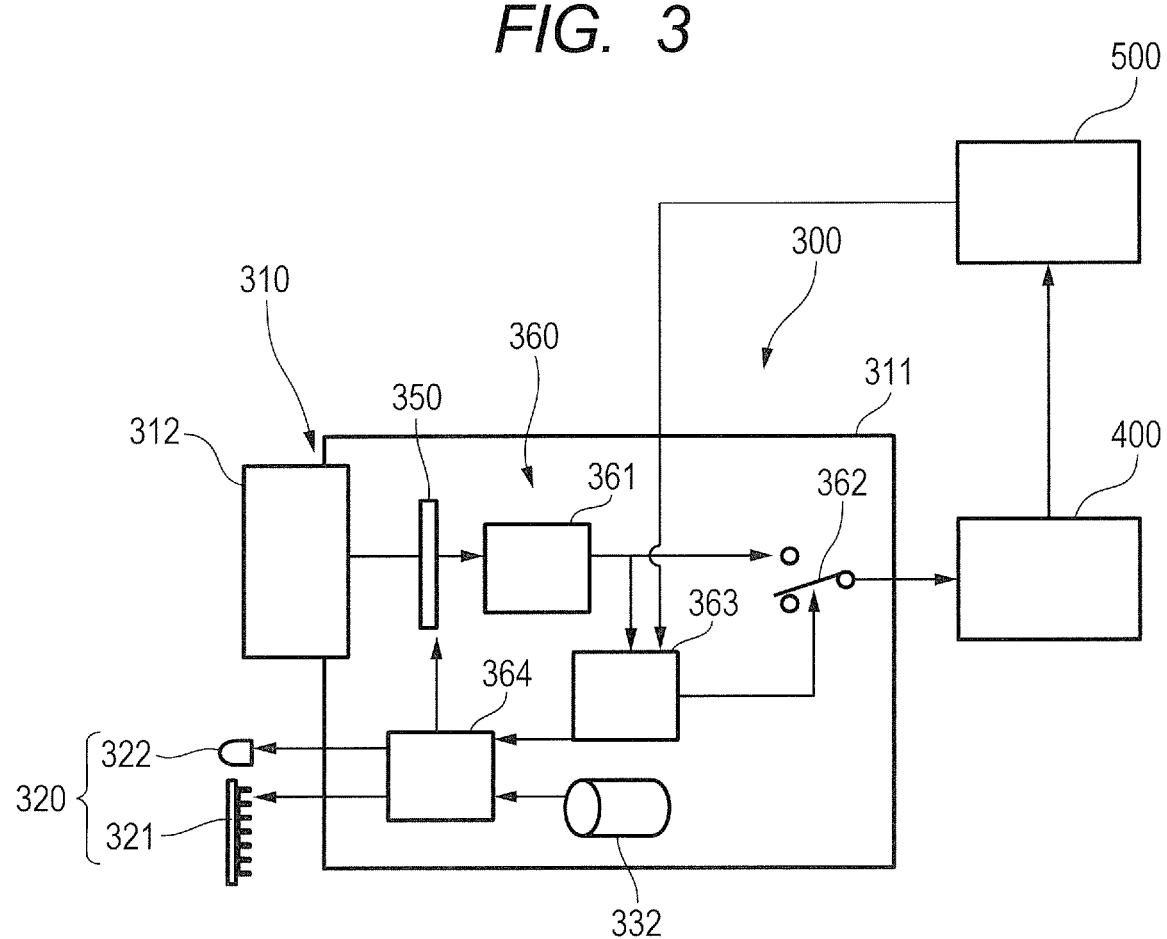
FIG. 3 is a block diagram illustrating a construction of a controlling system of the production system according to the first embodiment.

FIG. 3 is a block diagram illustrating a construction of a controlling system of the production system according to the first embodiment. Although a more complicated arithmetic operation is unnecessary by devising the illumination in the embodiment, it is necessary that a delay is small. For this purpose, it is desirable to install all circuits by hardware logic circuits without using a CPU (Central Processing Unit) having a large overhead. In FIG. 3, a logic (controlling unit) of the camera 300 is constructed by a controlling unit 360 comprising a pixel aligning circuit 361, an external outputting circuit 362, a work discriminating circuit 363, and an imaging controlling circuit 364. Setting information has been stored in an EEPROM (Electrically Erasable Programmable Read Only Memory) 332. The work discriminating circuit 363 and the imaging controlling circuit 364 control an imaging sensor 350 of the camera main body 310 and the light sources 321 and 322 in accordance with the setting information read out of the EEPROM 332 and execute each step of the imaging method. The work discriminating circuit 363 generates changing-over signals about a change in imaging condition and the presence or absence of an external output by a discriminating logic, which will be described later.

Figure 4:
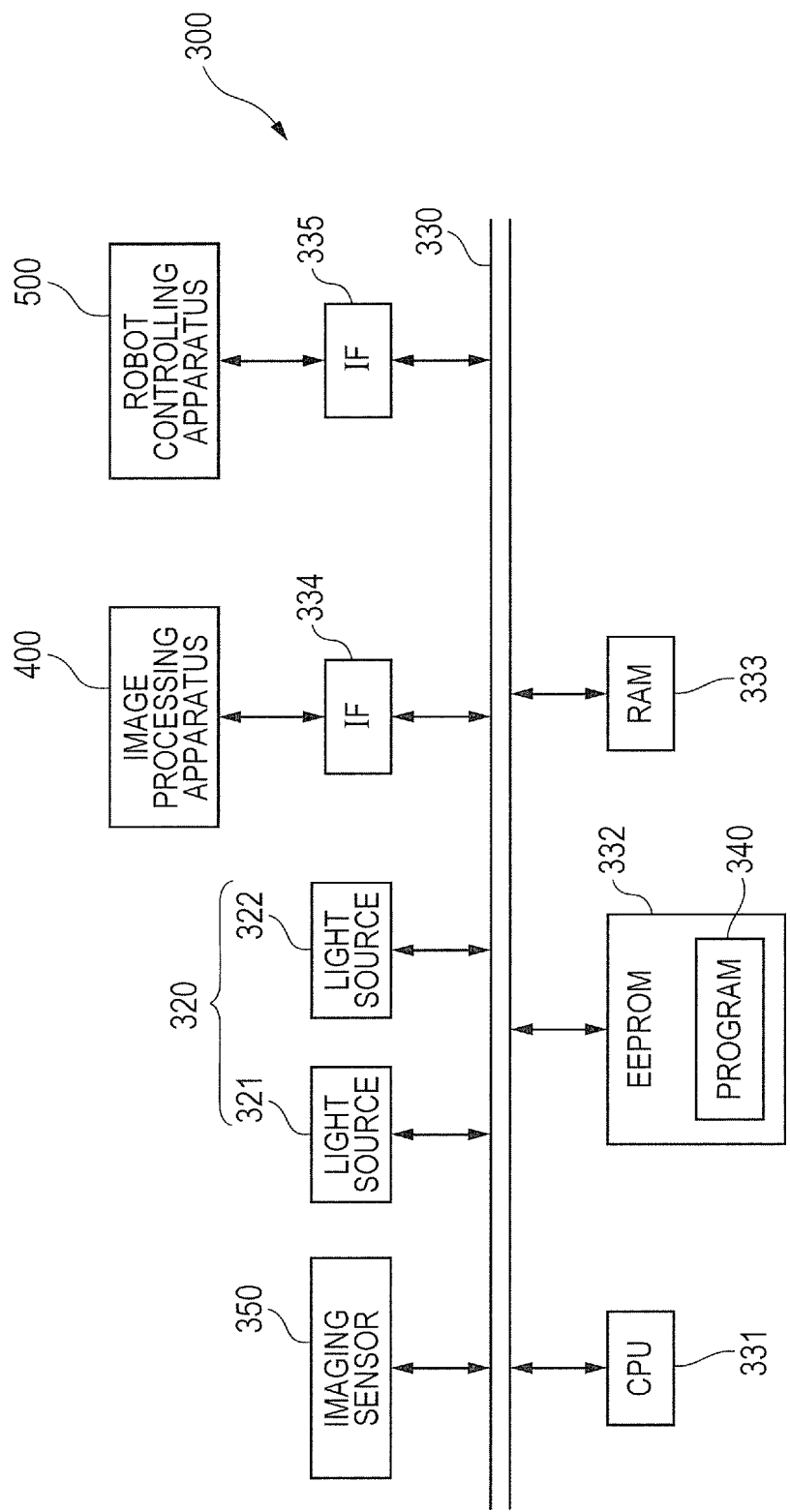
FIG. 4 is a block diagram illustrating another construction of the controlling system of the production system according to the first embodiment.

In the case when such an operation delay that a conveying speed is slow or the like, does not cause any problem, a CPU may be used as a controlling unit. FIG. 4 is a block diagram illustrating another construction of the controlling system of the production system according to the first embodiment.

The camera 300 has a CPU 331 as a controlling unit (processing unit). The camera 300 has the EEPROM 332 and a RAM (Random Access Memory) 333 as storing units. The camera 300 also has the imaging sensor 350, the light sources 321 and 322 (illuminating unit 320), and interfaces 334 and 335.

The EEPROM 332, RAM 333, imaging sensor 350, light sources 321 and 322, and interfaces 334 and 335 are connected to the CPU 331 through a bus 330. The EEPROM 332 is a non-volatile storing device (not shown) in which a program 340 for executing an arithmetic operating process, which will be described later, has been recorded. The CPU 331 controls the imaging sensor 350 of the camera main body 310 and each of the light sources 321 and 322 on the basis of the program 340 recorded (stored) in the EEPROM 332 and executes each step of the imaging method. The RAM 333 is a storing device for temporarily storing a result of an arithmetic operation, and the like, of the CPU 331.

In the case of using the CPU as a controlling unit, the computer-readable recording medium is the EEPROM 332 and the program 340 is stored in the EEPROM 332. However, the invention is not limited to such a construction. The program 340 may be recorded in any recording medium as long as it is a computer-readable recording medium. For example, as a recording medium for supplying the program 340, a non-volatile memory, a recording disk, an external storing device, or the like, may be used. When describing by mentioning a specific example, a flexible disk, a hard disk, an optical disk, a magnetooptic disk, a CD-ROM, a CD-R, a magnetic tape, a ROM, a USB memory, or the like, may be used as a recording medium.

In the case of using the CPU as a controlling unit, by executing the program 340, the CPU 331 executes the operations corresponding to the functions of the work discriminating circuit 363 and the imaging controlling circuit 364 in FIG. 3.

As mentioned above, the camera 300 has the camera main body 310 and the illuminating unit 320. Besides the casing 311 and the lens 312, the camera main body 310 has the imaging sensor 350 arranged in the casing 311. Although the controlling unit 360 is arranged in the casing 311, it may be arranged out of the casing 311.

The imaging sensor 350 is an image sensor that has a number of pixels arranged in a plane shape and is constructed in such a manner that by exposing those pixels for a predetermined time, an image focused onto a sensor surface through the lens 312 is converted into an electrical signal. The imaging sensor 350 outputs the image focused onto the sensor surface as digital data of each pixel.

As main imaging sensors, there are a CCD (Charge Coupled Device) image sensor and a CMOS (Complementary Metal Oxide Semiconductor) image sensor.

Since the CCD image sensor has a global shutter adapted to simultaneously expose all pixels, it is suitable to image a mobile object. On the other hand, the CMOS image sensor generally has a rolling shutter that outputs image data while shifting exposure timing every horizontal scan. If a mobile object is imaged by the CMOS image sensor having the rolling shutter, since the exposure timing differs for each horizontal direction, an image acquired by imaging is deformed from the actual shape. However, there is a CMOS image sensor having such a mechanism that data is temporarily stored every pixel. In such a sensor, since the global shutter can be realized, even if a mobile object is imaged, an output image is not deformed.

Since a mobile object is handled in the embodiment, the CCD image sensor or the CMOS image sensor having the global shutter is desirable as an imaging sensor 350. If such an inspection that the change in shape does not cause a problem is performed, the ordinary CMOS image sensor can be also used. In order to raise a frame rate for a period of time during which the apparatus waits for a work as will be described later, image data of all pixels is not output, but image data of the pixels in a partial region is selectively output. Generally, in the CCD image sensor, the pixels can be selected only in the horizontal direction in terms of its structure, while in the CMOS image sensor, the pixels can be freely selected in the horizontal and vertical directions. Therefore, the CMOS image sensor with the global shutter is most suitable for the embodiment.

In order to transfer the pixel outputs from the imaging sensor 350 to the image processing apparatus 400, the pixel aligning circuit 361 aligns the pixels in order or aligns the pixels in a parallel form. As an aligning order, there are various formats in dependence on the standard of a transfer interface.

The external outputting circuit 362 sets the digital signal into a state suitable for transfer in accordance with the standard of the interface. In the embodiment, further, whether or not the signal is output to the outside can be also selected.

The work discriminating circuit 363 discriminates whether or not the work W exists in a specified range (or whether or not the work W enters the specified range at the next timing).

Data showing the imaging condition of the camera main body 310 has previously been stored in the EEPROM 332. In a waiting mode before the main imaging operation for imaging the work W is executed, the imaging controlling circuit 364 sets the camera main body 310 into the imaging condition (first imaging condition) in the waiting mode stored in the EEPROM 332. In the waiting mode, in order to raise the frame rate as high as possible, it is desirable that the imaging controlling circuit 364 sets the camera main body 310 into a mode in which only an orbit portion of the retroreflective member 220 is obtained and the number of pixels is reduced. In the main imaging mode for imaging the work W, the imaging controlling circuit 364 sets the camera main body 310 into the imaging condition (second imaging condition) in the main imaging mode stored in the EEPROM 332. The imaging controlling circuit 364 controls the illuminating unit 320 in such a manner that, as an illuminating condition, in the waiting mode, a first illuminating condition, in which the light source 322 is used, is set, while in the main imaging mode, a second illuminating condition, in which the light source 321 is used, is set. In the waiting mode, the external outputting circuit 362 sets a mode in which the image data is not output to the outside.

Subsequently, the light sources 321 and 322 and the retroreflective member 220 will be described. In order to accurately perform an automatic imaging operation to a high speed mobile object, only a processing time on the order of μsec is permitted. On the other hand, by executing a hardware process in the camera 300 and cutting a transfer time, the time can be shortened. However, if only such a process is executed, it is insufficient. If it takes a time for an image process to detect a position of the work (that is, to detect the imaging timing), detection timing becomes timing after the work passed, so that the work cannot be imaged.

Figure 5A:
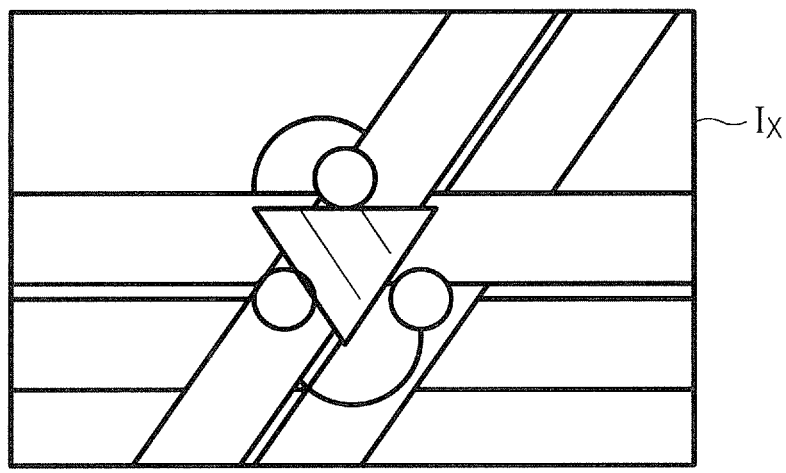
FIG. 5A is a schematic diagram illustrating an image to which a background has been projected in addition to the work.
Figure 5B:
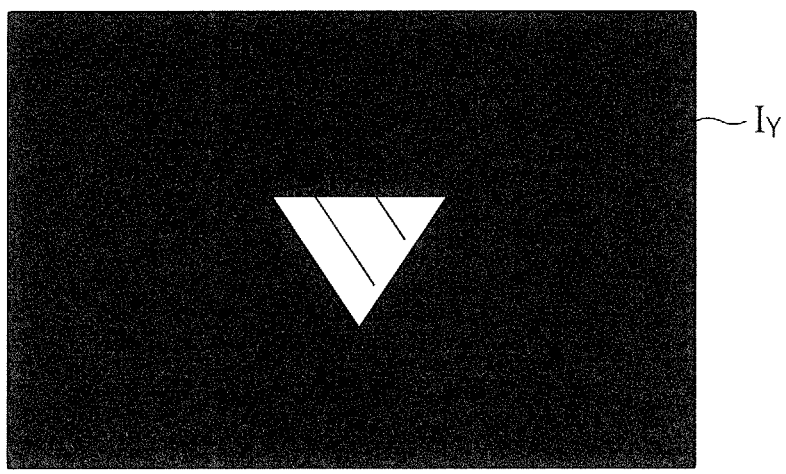
FIG. 5B is a schematic diagram illustrating an image in which the background has been masked.

There are various kinds of image processes in which it takes time. FIG. 5A is a schematic diagram illustrating an image Ix to which a background has been projected in addition to the work. In the arithmetic operating process for accurately specifying the position by separating the work from a complicated background by using the image Ix as illustrated in FIG. 5A, an arithmetic operation load is high. FIG. 5B is a schematic diagram illustrating an image $I_Y$ in which the background has been masked. If a dedicated inspecting apparatus is used, a masking member is disposed between the background and the work and the image $I_Y$ in which the background has been masked as illustrated in FIG. 5B is obtained, thereby reducing a load of the subsequent image process, and a processing speed can be raised. However, in a production system that performs the assembling operation, or the like, since a masking object becomes an obstacle to the operation, the background cannot be masked for the image process in many cases. In such an apparatus, for example, as illustrated in FIG. 5A, edges of the background and edges of the work are mixed on the image Ix and it is difficult to easily separate the work.

In the embodiment, the retroreflective member 220 and the illuminating condition (the first illuminating condition in which the light source 321 is lit off and the light source 322 is lit on, the second illuminating condition in which the light source 321 is lit on) are properly set. Thus, by obtaining the image in a state similar to that in FIG. 5B, the image process for the work detection is simplified, thereby realizing a high speed frame rate.

Figure 6A:
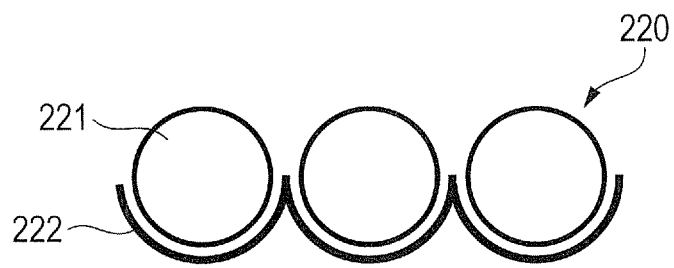
FIG. 6A is a schematic diagram illustrating an example of a retroreflective member that is used in the first embodiment.

FIGS. 6A to 6D are explanatory diagrams illustrating an example of a structure and a principle of the retroreflective member 220 that is used in the first embodiment. FIG. 6A is a schematic diagram illustrating an example of the retroreflective member 220 that is used in the first embodiment. As a retroreflective member 220 illustrated in FIG. 6A, a material of a high refractive index such as glass, or the like, called microbeads 221, and a reflecting member 222 attached to the bottom surface, are used.

Figure 6B:
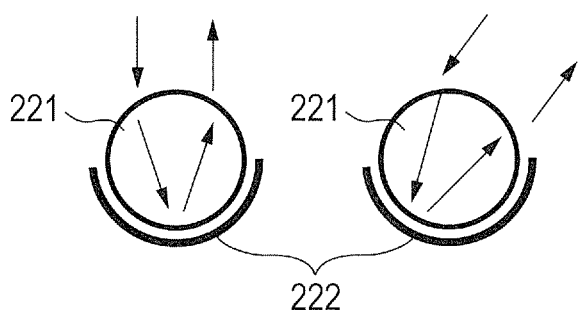
FIG. 6B is an explanatory diagram illustrating a principle of the example of the retroreflective member that is used in the first embodiment.

FIG. 6B is an explanatory diagram illustrating the principle of the example of the retroreflective member 220 that is used in the first embodiment. As illustrated in FIG. 6B, light that entered the microbeads 221 of the retroreflective member 220 is reflected in the original incident direction by the refraction of two times by the microbeads 221. Such a phenomenon that the light that entered from any direction is reflected in the original direction is called a retroreflecting. If a size of each of the microbeads 221 is decreased and the microbeads are closely spread over, such a state is similar to a state when the light is reflected by the whole surface in a macro manner.

Figure 6C:
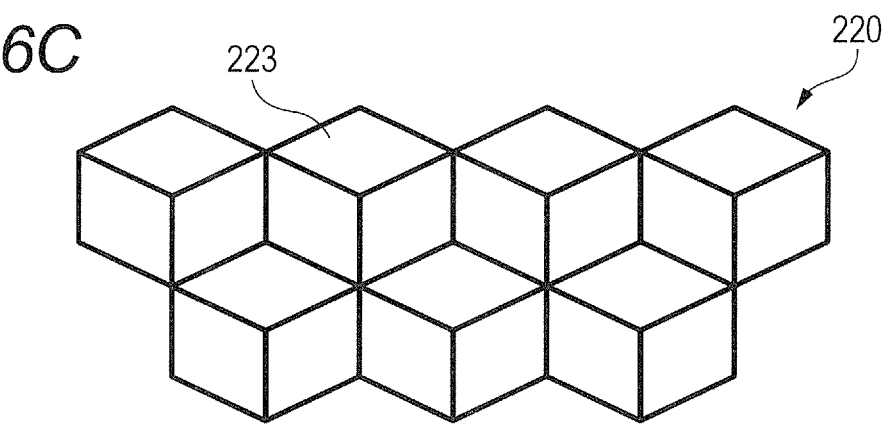
FIG. 6C is a schematic diagram illustrating another example of the retroreflective member that is used in the first embodiment.

FIG. 6C is a schematic diagram illustrating another example of the retroreflective member 220 that is used in the first embodiment. The retroreflective member 220 illustrated in FIG. 6C is called a corner cube having a structure comprising plane mirrors 223 that were adhered so as to mutually have a predetermined angle and a concave shape.

Figure 6D:
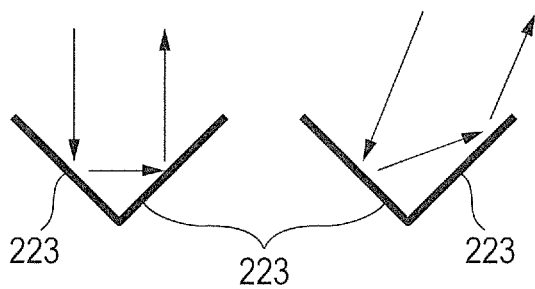
FIG. 6D is an explanatory diagram illustrating a principle of another example of the retroreflective member that is used in the first embodiment.

FIG. 6D is an explanatory diagram illustrating a principle of another example of the retroreflective member 220 that is used in the first embodiment. Also, in this case, as illustrated in FIG. 6D, the incident light shows such a retroreflective property that, since it is reflected some times by the plane mirrors 223, it is returned to the original direction.

According to those retroreflective members 220, by suppressing an attenuation caused by the microbeads 221 and the plane mirrors 223, brightness that is almost equal to that by the regular reflection can be obtained. The retroreflective member 220 is not limited to those members, but any member having the retroreflective property may be used.

Figure 7:
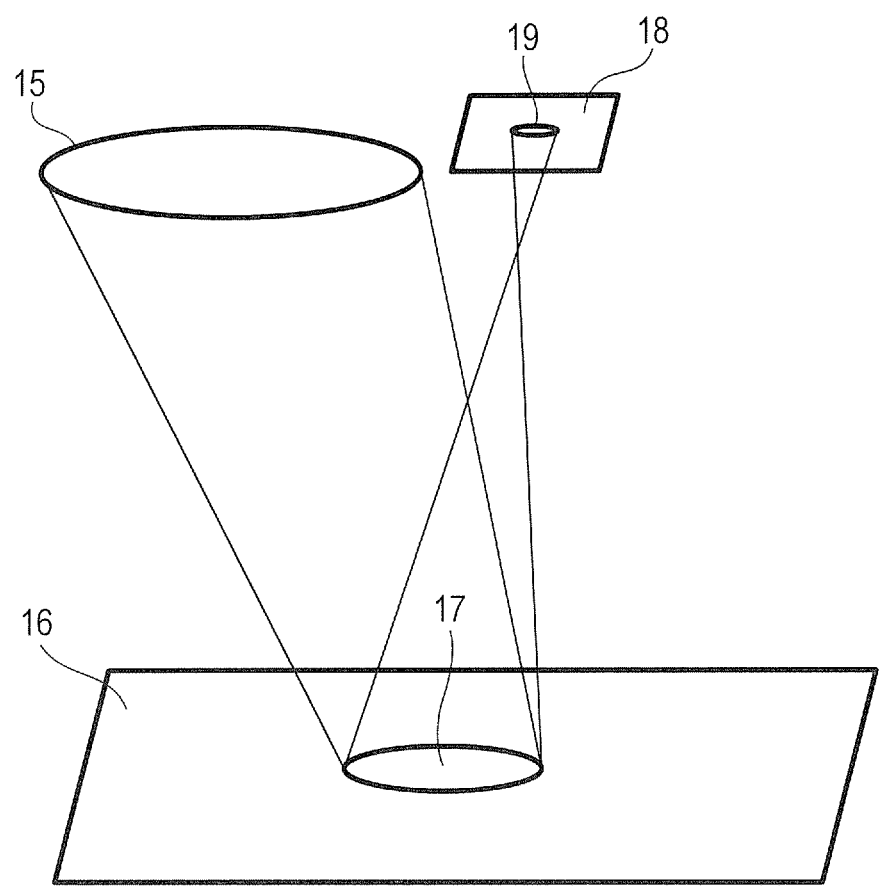
FIG. 7 is an explanatory diagram of an image that is focused by a camera in the case where light irradiated from a light source has been reflected by a mirror surface.

The light sources will now be described in detail. FIG. 7 is an explanatory diagram of an image that is focused by the camera in the case when the light irradiated from the light source has been reflected by the mirror surface. A size of a portion in which the light is irradiated from the light source is called an opening 15. In the case of a circular illumination, the opening 15 can be expressed by a diameter of a circle. In the case of a rectangular illumination, the opening 15 can be expressed by a length of a long side and a length of a short side. A surface that is actually imaged by the camera is assumed to be a work surface 16 and an image plane 18 is defined at a position of the camera. In the case when the work surface 16 is a mirror surface and the light was irradiated to a region 17 of the work surface 16, the reflected light from the region 17 is projected to a region 19 of the image plane 18. The region 17 is called a region of a bright field of view and is used for various kinds of inspection and measurement. A region other than the region 17 is called a region of a dark field of view.

Figure 8A:
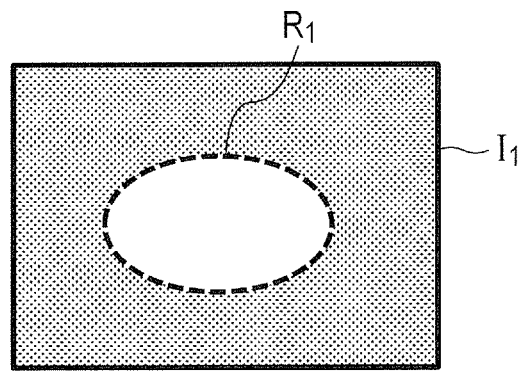
FIG. 8A is a schematic diagram illustrating an image acquired by imaging in the case when the work surface is a glossy surface.

FIG. 8A is a schematic diagram illustrating an image acquired by imaging in the case when the work surface is a glossy surface. When the work surface 16 in FIG. 7 is a glossy surface, as illustrated in FIG. 8A, a region $R_1$ of a bright field of view in which only the portion corresponding to the opening is brightly shiny and an image $I_1$ in which other portion is dark are imaged. When a distance between the illumination and the work and a distance between the work and the camera are equal, a similitude ratio of the region $R_1$ of a bright field of view to the opening of the illumination is equal to ½ from a similitude relation.

Figure 8B:
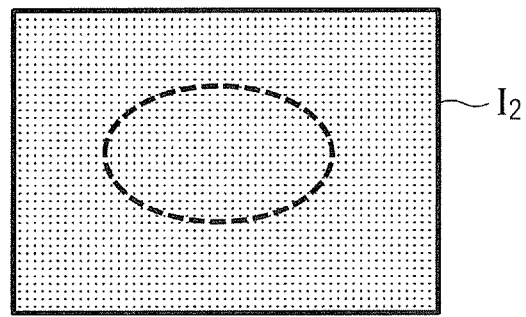
FIG. 8B is a schematic diagram illustrating an image acquired by imaging in the case when the work surface is a diffusing surface.

FIG. 8B is a schematic diagram illustrating an image acquired by imaging in the case when the work surface is a diffusing surface. When the work surface 16 in FIG. 7 is a diffusing surface, as illustrated in FIG. 8B, a region $I_2$ of a dark field of view that is uniformly slightly dark is obtained.

In the embodiment, when the light source 322 is used as an illumination as illustrated in FIG. 1, since the opening of the light source 322 is close to the camera main body 310, in principle, the light emitted from the light source 322 is returned to the direction of the camera main body 310 by the retroreflective member 220.

Figure 8C:
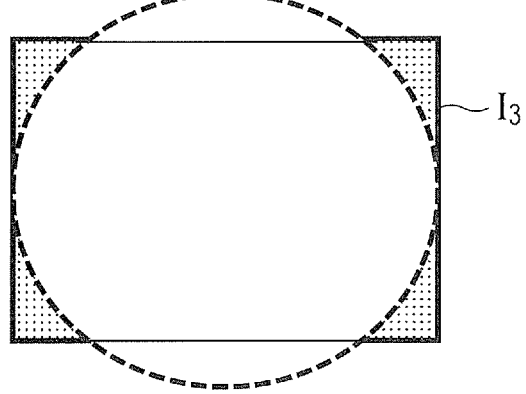
FIG. 8C is a schematic diagram illustrating an image acquired by imaging in the case when the work surface is a retroreflective sheet.

FIG. 8C is a schematic diagram illustrating an image acquired by imaging in the case when the work surface 16 is a retroreflective sheet. That is, when the work surface 16 in FIG. 7 is a retroreflective sheet, a bright image 13 corresponding to the bright field of view in a range (luminous intensity range) in which the light of the illumination reaches and that is shown by a broken line in FIG. 8C is obtained.

As for the opening of the light source 322, the reflecting direction of the retroreflective light is not limited, because the light is returned almost to the direction of the light source at any position in the mark. However, the opening of a proper size is necessary in order to brightly and uniformly illuminate the luminous intensity range of the work surface 16 as much as possible.

Figure 9A:
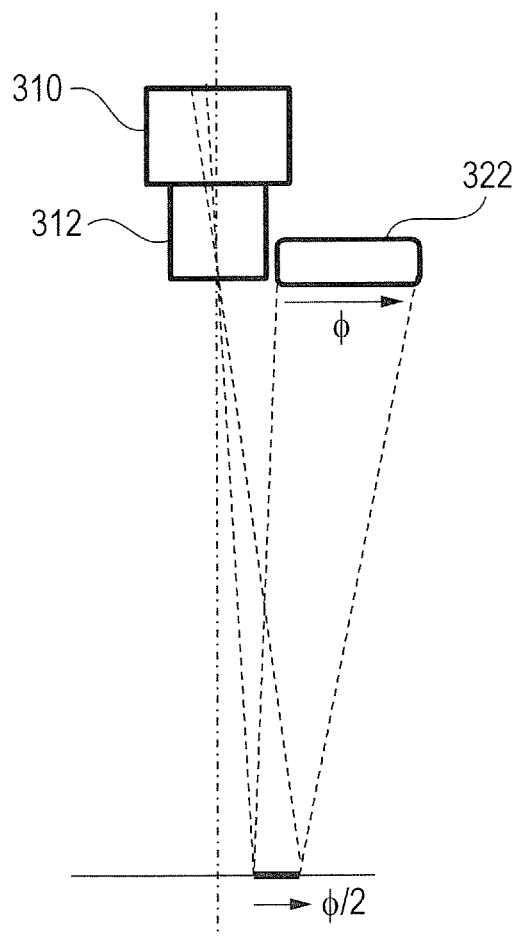
FIG. 9A is a schematic diagram illustrating a path of light irradiated from a second light source in the case when the work surface is similar to the mirror surface.
Figure 9B:
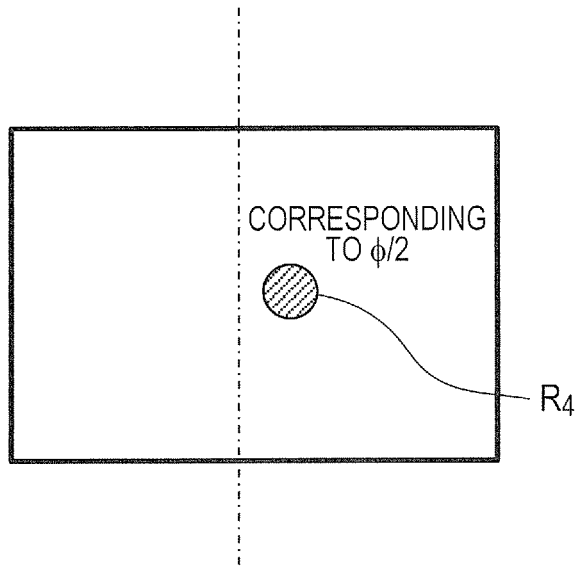
FIG. 9B is a schematic diagram illustrating an image which is imaged to a camera main body in the state of FIG. 9A.

FIG. 9A is a schematic diagram illustrating a path of the light irradiated from the light source 322 in the case when the work surface is similar to the mirror surface. FIG. 9B is a schematic diagram illustrating an image that is imaged to the camera main body in the state of FIG. 9A. When the work surface 16 is similar to the mirror surface, a region $R_4$ of a bright field of view in which a similitude ratio to the opening of the light source 322 is equal to ½ exists even to the light source 322.

In the region $R_4$ of the bright field of view, since it is always shiny by the regular reflection, the light cannot be separated from the reflected light from the retroreflective member (mark) 220. That is, this region $R_4$ becomes a singular spot in which whether or not it corresponds to the mark cannot be detected. Therefore, it is better that the opening of the light source 322 is as small as possible.

At this time, if the opening of the light source 322 is smaller than the retroreflective member (mark) 220, whether the light is the light from the regular reflecting portion or the retroreflected light can be distinguished by an area of a light spot. Therefore, the position of the work W can be stably detected. Thus, if the number of retroreflective members (marks) 220 is equal to one, it is desirable that an area of the retroreflective member 220 is greater than an area of the opening of the light source 322.

If a plurality of retroreflective members (marks) 220 are provided for the robot hand 202, it is desirable that an area of a region (minimum region), including those plurality of retroreflective members 220, is greater than the area of the opening of the light source 322. If the area of such a region is set to be greater than the area of the opening of the light source 322, a mark portion that avoids a singular point exists certainly and an effect similar to that in the case of using the large mark is obtained.

It is desirable that an intensity of the light of the light source 322 and an exposure of the camera main body 310 are set in such a manner that the light to the glossy surface to a diffusing object or a region of a dark field of view is sufficiently dark and the light to the retroreflecting is sufficiently bright. For example, assuming that an average of the brightness of the former portion is equal to $\mu d$, a standard deviation is equal to $\sigma d$, an average of the brightness of the latter portion is equal to $\mu b$, and a standard deviation is equal to $\sigma b$, respectively, if they are set so as to obtain a relation of $(\mu b - \mu d)/(\sigma b + \sigma d) \geq 3$, both regions can be clearly separated in terms of a practical use.

Figure 10A:
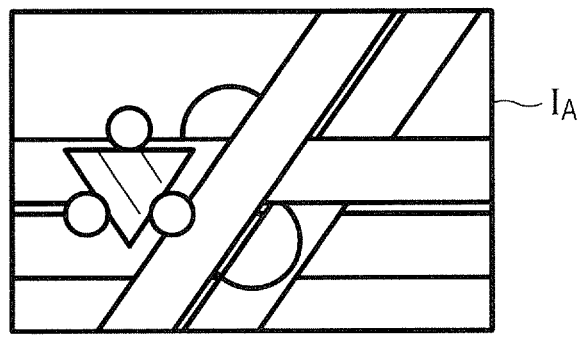
FIG. 10A is a schematic diagram illustrating an image acquired by imaging a work to the camera main body in the case when the work has been illuminated by the first light source.
Figure 10B:
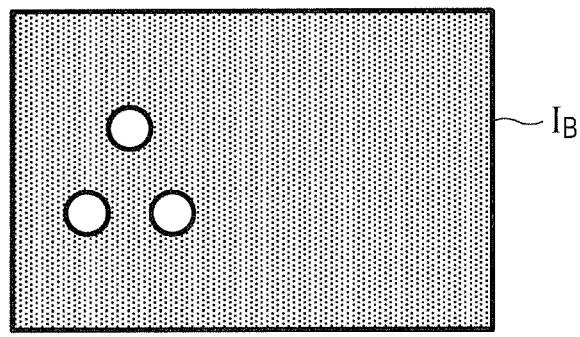
FIG. 10B is a schematic diagram illustrating an image acquired by imaging a work to the camera main body in the case when the work has been illuminated by the second light source.
Figure 10C:
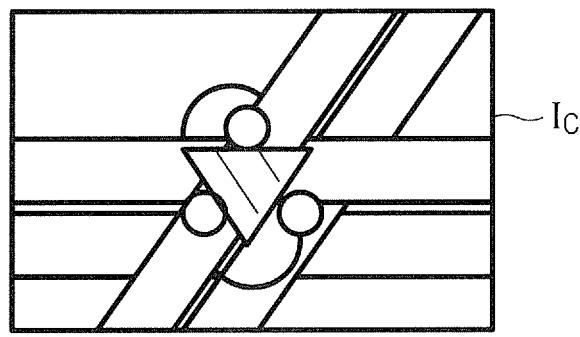
FIG. 10C is a schematic diagram illustrating an image acquired by imaging a work to the camera main body in the case when the work was moved and has been illuminated by the first light source.
Figure 10D:
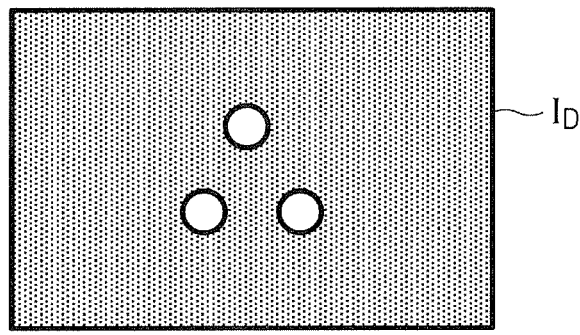
FIG. 10D is a schematic diagram illustrating an image acquired by imaging a work to the camera main body in the case when the work was moved and has been illuminated by the second light source.

FIG. 10A is a schematic diagram illustrating an image acquired by imaging the work K to the camera main body 310 in the case when the work has been illuminated by the light source 321. FIG. 10B is a schematic diagram illustrating an image acquired by imaging the work W to the camera main body 310 in the case when the work has been illuminated by the light source 322. FIG. 10C is a schematic diagram illustrating an image acquired by imaging the work W to the camera main body 310 in the case when the work W was moved and has been illuminated by the light source 321. FIG. 10D is a schematic diagram illustrating an image acquired by imaging the work W to the camera main body 310 in the case when the work W was moved and has been illuminated by the light source 322.

In the case when the work was moved from the left to the right when viewed from the camera main body 310, if the light source 321 is used as an illumination, an image $I_A$ acquired by imaging as illustrated in FIG. 10A and an image $I_C$ acquired by imaging as illustrated in FIG. 10C are obtained. On the other hand, in the case when the work was moved from the left to the right when viewed from the camera main body 310, if the light source 322 is used as an illumination, an image $I_B$ acquired by imaging as illustrated in FIG. 10B and an image $I_D$ acquired by imaging as illustrated in FIG. 10D are obtained.

If the image is imaged by using the light source 322 as mentioned above, the background becomes dark because a light quantity is insufficient. However, only in the portions where the retroreflective members 220 were arranged, a brightness similar to that in the case when the light source 322 was directly imaged is obtained. Therefore, as illustrated in FIGS. 10B and 10D, only such portions are brightly projected. In FIGS. 10B and 10D, it is presumed that the regular reflecting member does not exist in the singular spot that is caused as a result of the arrangement of the light source 322. When the regular reflecting member exists in the singular spot and cannot be mechanically moved, it is sufficient that the portion of such a region is masked so as not to be evaluated at the time of discrimination.

The light source 321 is selected in accordance with a purpose of measurement and inspection. For example, in the case of measuring the bright field of view, the illumination of a large opening is arranged so as to have a region of a bright field of view larger than the work. In the case of using the illumination in the dark field of view, such an illumination that a light quantity is larger than that of the light source 322, and there is no variation in a wide area, is arranged. In order to realize the illumination in which there is no variation in the wide area, a uniform illumination having a wide opening is necessary. Therefore, even in any one of the imaging of the bright field of view and the imaging of the dark field of view, the opening of the light source 321 is set to be larger than that of the light source 322. In other words, the opening of the light source 322 is set to be smaller than that of the light source 321.

Figure 11:
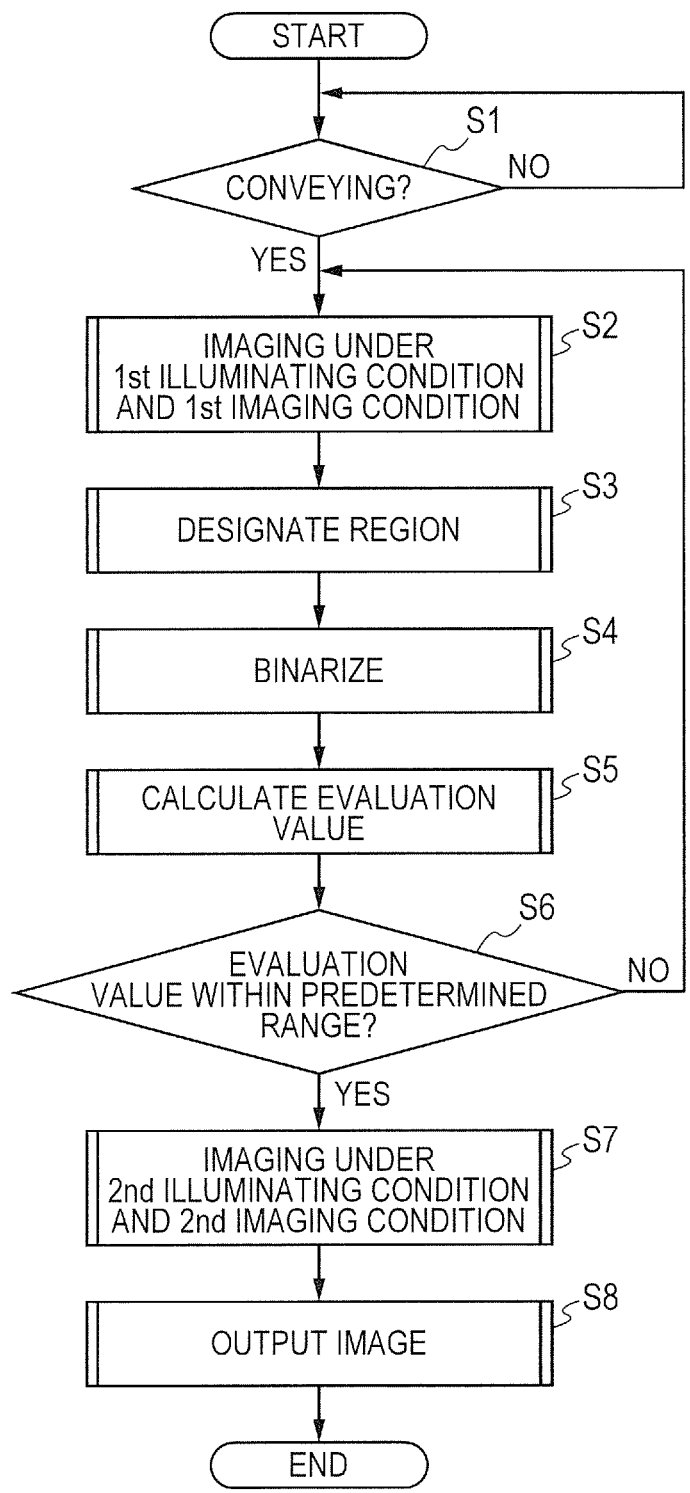
FIG. 11 is a flowchart showing an imaging method according to the first embodiment.

Subsequently, an imaging method according to the embodiment will be described. FIG. 11 is a flowchart showing the imaging method according to the first embodiment. In Japanese Patent Application Laid-Open No. 2010-221381, the mark is used for the purpose of measuring the position and orientation of the assembling pallet. However, in the embodiment, the mark is used for the purpose of detecting the timing for imaging the work W.

First, the work discriminating circuit 363 discriminates whether or not a signal showing that the work W is being conveyed has been input from the robot controlling apparatus 500, that is, whether or not the robot 200 is conveying the work W (S1). If the robot 200 is not conveying the work W (S1: NO), the work discriminating circuit 363 waits until the robot 200 is conveying the work W.

If the robot 200 is conveying the work W (S1: YES), the work discriminating circuit 363 sets the illuminating condition under which the illuminating unit 320 illuminates and the imaging condition adapted to make the camera main body 310 perform the imaging and allows the camera main body 310 to image under those set conditions (S2). At this time, the illuminating condition is set to the first illuminating condition in which the light source 321 is lit off and the light source 322 is lit on.

Since the image acquired by imaging in step S2 is used to detect the timing (position) for imaging the work W, it is not always necessary for the image processing apparatus 400. Therefore, in the external outputting circuit 362, the image output is turned off. If an external inputting apparatus can cope with a high speed switching of a resolution, the image output may have been held in an ON state.

In step S2, the imaging controlling circuit 364 sets the imaging condition into the first imaging condition in which the resolution is low. That is, although the imaging controlling circuit 364 may obtain the image data of all pixels in the image acquired by imaging, in the first embodiment, the image data of the pixels in only a partial region in the image acquired by imaging is obtained. Specifically speaking, it is sufficient that a mark position is preliminarily taught and the image data of only a peripheral portion of such a position is extracted. Desirably, the resolution is limited to the least value necessary to detect the optimum imaging position.

Figure 12:
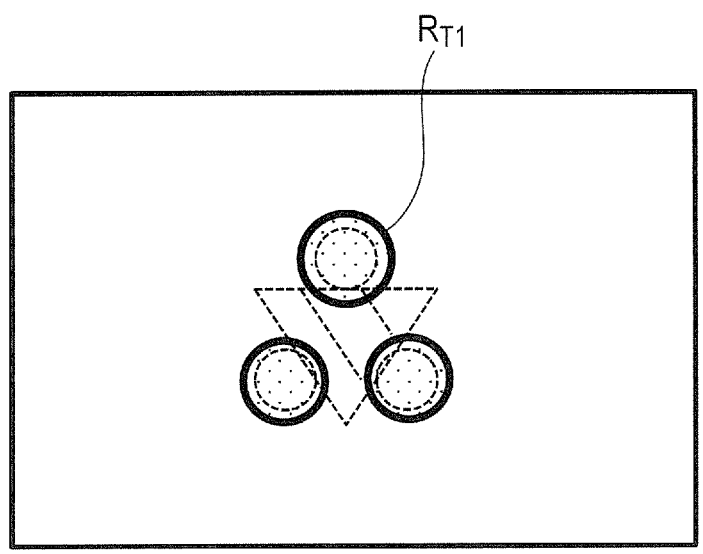
FIG. 12 is a schematic diagram illustrating an example of a pixel region when image data is accessed by an imaging controlling circuit in the first embodiment.

FIG. 12 is a schematic diagram illustrating an example of a pixel region where image data is accessed by the imaging controlling circuit 364 in the first embodiment. In FIG. 12, an inside surrounded by a bold line is a pixel region (partial region) $R_{T1}$ where image data is fetched by the imaging controlling circuit 364. The pixel region $R_{T1}$ shows a region where the data of the pixel of almost the same size as that of the image of the reflected light from the retroreflective member 220 at the target imaging position is obtained. The number of pixels that are used in the arithmetic operation in the work discriminating circuit 363 can be reduced and the arithmetic operation load decreases, so that the frame rate can be raised. Therefore, the invention can cope with the movement of the work W of a higher speed.

The imaging controlling circuit 364 further limits a region that is used to calculate an evaluation value (position of the center of gravity), which will be described later, at a high speed in accordance with necessity (S3). For example, such a range can be decided in consideration of a moving speed, or the like, from the position of the center of gravity that was calculated at a previous time.

Subsequently, the work discriminating circuit 363 executes a binarizing process to the image acquired by imaging in step S2, that is, to each pixel in the pixel region $R_{T1}$ (S4). Subsequently, the work discriminating circuit 363 obtains an evaluation value regarding the luminance of the pixel in the binarized image (S5). More specifically speaking, the work discriminating circuit 363 obtains a sum $\Sigma P(x, y)$ of the coordinate values of the pixel that is brighter than a predetermined luminance (predetermined value). The work discriminating circuit 363 obtains the number n of pixels brighter than the predetermined luminance and obtains a position of the center of gravity $\Sigma P(x, y)/n$ as an evaluation value. On the basis of the obtained evaluation value, the work discriminating circuit 363 discriminates whether or not the illuminating condition and the imaging condition are switched (S6). In the embodiment, the foregoing processes of steps S3 to S6 correspond to a changing-over process (changing-over step).

If it is determined that those conditions are not switched (S6: NO), the work discriminating circuit 363 returns to the process of step S2 and repetitively executes the imaging operation until it is decided that those conditions are switched. That is, the work discriminating circuit 363 repetitively executes the imaging operation for allowing the camera main body 310 to image the work until the evaluation value lies within a predetermined range in a state when the light source 321 is lit off and the light source 322 is lit on during the conveyance of the work W by the robot 200 (first imaging process, first imaging step). By this routine, the imaging controlling circuit 364 obtains the image that was acquired by imaging and to which the reflected light from the retroreflective member 220 was projected, more specifically describing, the image which was acquired by imaging and in which the reflected light from the retroreflective member 220 was projected to the pixel region $R_{T1}$ illustrated in FIG. 12.

If it is determined in step S6 that those conditions are switched (S6: YES), the imaging controlling circuit 364 uses a result of the discrimination as a trigger, changes the illuminating condition under which the illuminating unit 320 illuminate and the imaging condition adapted to allow the camera main body 310 to image, and allows the camera main body 310 to image the work under the changed conditions (S7). At this time, the illuminating condition is set to the second illuminating condition in which the light source 321 is lit on. The imaging condition is set to the second imaging condition in which the resolution is higher than that in the first imaging condition. In the second illuminating condition, although the light source 322 may be held in an ON state, it is lit off in the first embodiment.

That is, the imaging controlling circuit 364 switches the illuminating condition to the second illuminating condition, switches the setting and the imaging condition of the camera main body 310 to the second imaging condition, and executes the final imaging operation. At this time, the resolution is set to such a value that at least the whole work enters and the sufficient resolution is obtained. Further, in the work discriminating circuit 363, the external output is turned on, and the image that was acquired by imaging and to which the work W was projected is output to the image processing apparatus 400 which executes the main imaging process.

That is, in step S7, the imaging controlling circuit 364 allows the camera main body 310 to image the work in a state when the light source 321 was lit on during the conveyance of the work W by the robot 200 (second imaging process, second imaging step). The external outputting circuit 362 outputs the image acquired by imaging in step S7 to the image processing apparatus (external apparatus) 400 (S8: outputting process, outputting step).

Step S6 will be described further specifically. The work discriminating circuit 363 discriminates whether or not the obtained evaluation value lies within the predetermined range including an evaluation value at the optimum imaging position (target imaging position). If the evaluation value (position of the center of gravity in the first embodiment) is out of the predetermined range (S6: NO), the processing routine is returned to step S2 and the work is imaged again. That is, when the reflected light is not projected to the pixel region $R_{T1}$ illustrated in FIG. 12, the work is imaged again. The predetermined range is decided by an allowable error (for example, which is decided by whether or not the singular spot can be seen, a regular reflecting condition, or the like), which is calculated from the positional relation between the work and the camera, a speed of the mobile object that is presumed, an imaging interval of the camera, and the like.

The work discriminating circuit 363 sets the timing when it is decided that the obtained evaluation value lies within the predetermined range including the evaluation value at the optimum imaging position (S6: YES) to the imaging timing. The imaging controlling circuit 364 uses such a timing as a trigger, switches the conditions to the second illuminating condition and the second imaging condition, and images the work W. That is, since the reflected light has been projected to the pixel region $R_{T1}$ illustrated in FIG. 12, such a timing is used as a trigger, and the work W is imaged. If the evaluation value of the previous time is used, a movement amount between the frames and the speed are obtained. Therefore, the discrimination may be made between the frames in a sampling manner by using them.

As mentioned above, in step S6, the work discriminating circuit 363 sets the timing for switching from the first imaging process to the second imaging process, that is, the imaging timing on the basis of the image that was acquired by imaging in step S2 and to which the reflected light was projected. In other words, in accordance with the obtained evaluation value, the work discriminating circuit 363 switches from the first imaging process for detecting the imaging timing to the second imaging process for imaging the work W.

As mentioned above, the imaging operation is repetitively executed until a predetermined condition in which the timing for imaging the work W (in the embodiment, condition in which the evaluation value lies within the predetermined range) is satisfied. When the predetermined condition is satisfied, the work is imaged once under the second illuminating condition in which the light source 322 is lit on and the second imaging condition in which the resolution is high.

According to the embodiment, when the apparatus waits for the work W, by lighting on the light source 322, the shutter speed is set to be high and the frame rate is raised, so that the image that was acquired by imaging and to which the reflected light from the retroreflective member 220 as a mark was projected can be obtained. The moving work W can be imaged under the light irradiation by the light source 321 at the timing set by the image that was acquired by imaging and to which the retroreflective member 220 was projected. Therefore, while the work W is conveyed at a high speed, the work W can be certainly imaged. That is, by detecting the timing upon imaging by using the retroreflective member 220 and by switching the illumination to another bright light source 321 having the wide opening at the timing when the work W is projected to the image acquired by imaging, the automatic imaging can be stably performed at a high speed at a good position.

Since the calculations of the work discriminating circuit 363 can be executed in parallel synchronously with and almost simultaneously with the pixel output from the imaging sensor 350, unlike such an image process that after all frames were obtained, an arithmetic operation is executed, a delay amount of the arithmetic operation is very low. Therefore, an imaging position (namely, imaging timing) of the mobile object can be set. Thus, according to the embodiment, the work W as a mobile object can be automatically imaged at a predetermined position during the conveyance without stopping the work W. The automatic imaging can be stably performed at a high speed at a good position.

Since the retroreflective member 220 is used as a mark, the reflected light from the retroreflective member 220 enters the camera main body 310 even when the retroreflective member 220 is located at any position as long as it lies within a range capable of imaging by the camera main body 310. Therefore, there is no need to move the light source 322 in accordance with the position of the robot hand 202.

Since the data of the pixels only in the pixel region $R_{T1}$ in the image acquired by imaging is obtained in step S2, the arithmetic operating time can be shortened and the frame rate can be further raised. Consequently, the work W that moves at a high speed can be imaged at the same imaging position.

Since the process is switched from the imaging process for imaging the reflected light from the retroreflective member 220 to the imaging process for imaging the work W in accordance with the evaluation value in step S6, the work W that is conveyed to the robot 200 can be imaged at the same imaging position. Particularly, since a position of the center of gravity of the pixel brighter than the predetermined luminance is obtained as an evaluation value and when the position of the center of gravity lies within the predetermined range, the imaging process is switched, the work W can be imaged at the same imaging position.

Since only the image necessary for the image processing apparatus 400 can be transferred, for a period of time during which the work W reaches the imaging position, the imaging process that is surplus in the image processing apparatus 400 becomes unnecessary. In other words, since such a process that the unnecessary images are disposed or whether or not the transferred image is a necessary image is discriminated becomes unnecessary in the image processing apparatus 400, the system can be easily constructed.

It is desirable that the shapes or colors of a plurality of retroreflective members 220 are made different. Consequently, when the position of the work is discriminated, since the retroreflective members 220 are arranged on the imaging surface in a plane manner so as to mutually have a positional relationship at the positions where the shapes and colors have already been known, the positions of the retroreflective members 220 can be accurately specified.

(Modification 1)

In the first embodiment, the binarizing process is executed and the position of the center of gravity is obtained as an evaluation value with respect to the pixel brighter than the predetermined luminance. However, the invention is not limited to such a method. It is also possible to use a method whereby the binarization is not executed, but a sum of the values obtained by multiplying coordinate values P(x, y) by a luminance b of the pixel is obtained and is divided by a sum Σb of the luminances, and a resultant arithmetic operation value Σ(b·P(x, y))/Σb may be obtained as an evaluation value. In this case, in step S6 in FIG. 11, it is sufficient to discriminate whether or not the arithmetic operation value Σ(b·P(x, y))/Σb lies within the predetermined range.

(Modification 2)

In place of the method of calculating the position of the center of gravity, a state when the bright spots exist continuously in the partial region may be used as an evaluation value by using the continuity of the marks. That is, an area (the number of pixels) of the continuous pixels that are brighter than the predetermined luminance may be obtained as an evaluation value. Also, in this case, in step S6 in FIG. 11, it is sufficient to discriminate whether or not the area (the number of pixels) lies within the predetermined range. In this case, since there is no need to calculate the position of the center of gravity, the imaging position can be evaluated at a very high speed.

(Modification 3)

In place of the method of calculating the position of the center of gravity, a method whereby a changing-over position of bright and dark portions in the range of the partial region can be also used. According to this method, since it is sufficient to evaluate only a very narrow region, a further high speed can be realized.

Second Embodiment

An imaging apparatus (imaging method) according to the second embodiment of the invention will now be described. The imaging apparatus of the second embodiment has a construction similar to that of the imaging apparatus described in the first embodiment and the contents of the program 340, that is, the imaging method differs from that of the first embodiment.

Figure 13:
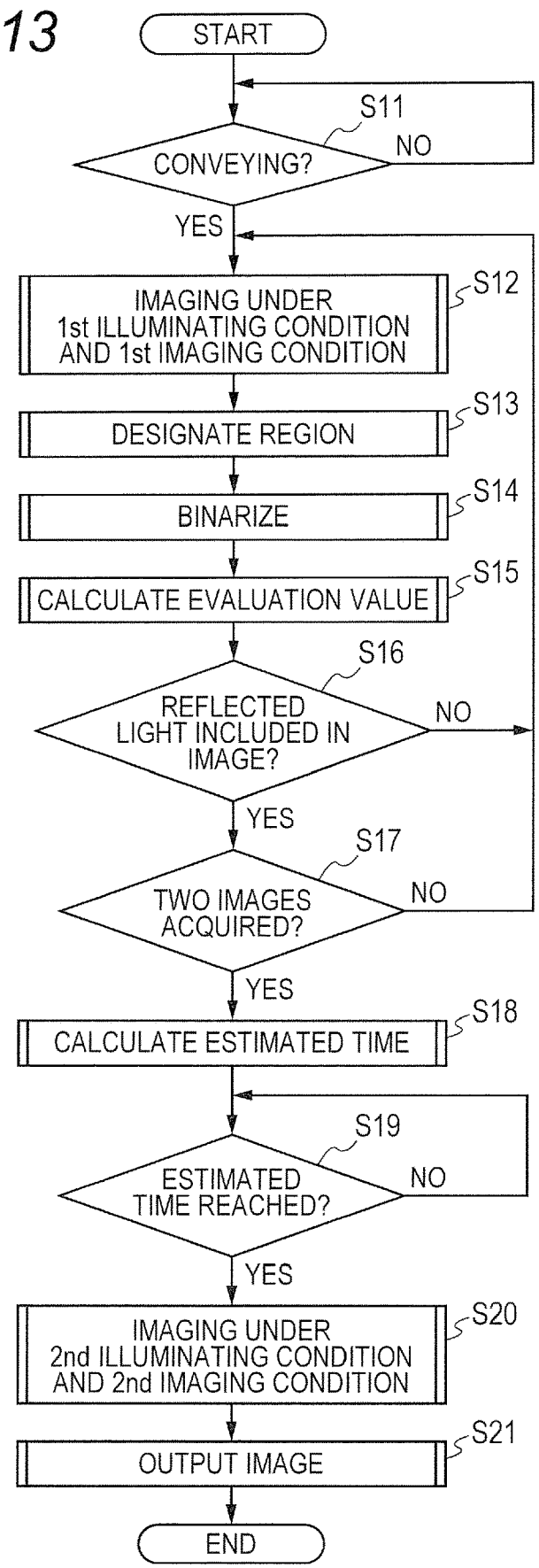
FIG. 13 is a flowchart showing an imaging method according to the second embodiment.

FIG. 13 is a flowchart showing the imaging method according to the second embodiment. The imaging method shown in FIG. 13 is attained by executing a hardware logic of the work discriminating circuit 363 and the imaging controlling circuit 364 illustrated in FIG. 3. Processes of steps S11 to S15 in FIG. 13 are almost similar to those of steps S1 to S5 in FIG. 11. In this instance, although the data of all pixels in the image acquired by imaging may be obtained in step S12, in the second embodiment, the data of the pixels only in the partial region in the image acquired by imaging is obtained.

Figure 14:
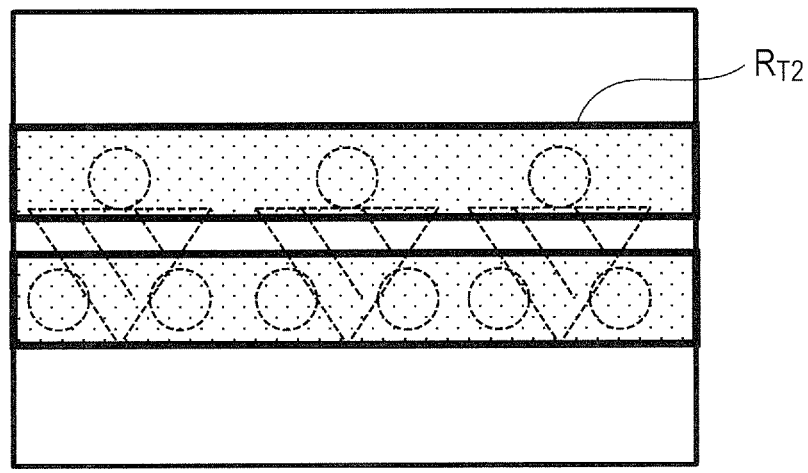
FIG. 14 is a schematic diagram illustrating an example of a pixel region when image data is accessed by an imaging controlling circuit in the second embodiment.

FIG. 14 is a schematic diagram illustrating an example of a pixel region where image data is accessed by the imaging controlling circuit 364 in the second embodiment. In FIG. 14, an inside portion surrounded by a bold line is a pixel region (partial region) $R_{T2}$ where image data is accessed by the imaging controlling circuit 364. The number of pixels that are used in the arithmetic operation in the work discriminating circuit can be reduced and the arithmetic operation load decreases, so that the frame rate can be raised. Therefore, the invention can cope with the movement of the work W of a higher speed.

In this instance, the partial region $R_{T2}$ is a pixel selecting region suitable for the case when an orbit, on which the mark using the retroreflective member 220 passes, has been predetermined. The selected pixel exists at the position that covers the orbit of the mark. In step S15, in a manner similar to the first embodiment, coordinate values of the position of the center of gravity of the image to which the reflected light from the retroreflective member 220 has been projected are calculated as an evaluation value. Thus, the present position of the work W can be estimated.

In the second embodiment, the work discriminating circuit 363 discriminates whether or not the obtained evaluation value is such a value that it can be judged that the reflected light from the retroreflective member 220 has been projected to the image (S16). In the second embodiment, since a plurality of retroreflective members 220 are arranged, whether or not all of the reflected light from the plurality of retroreflective members 220 has been projected to the image is discriminated.

If it is determined that the reflected light from all of the retroreflective members 220 has been projected to the image, the work discriminating circuit 363 obtains at least two frames (images) to which the reflected light of the retroreflective member 220 has been projected (S17).

The work discriminating circuit 363 obtains a speed vector by using the position of the center of gravity calculated in the frames before and after the current frame and calculates time of estimation (estimated time) when the work reaches the target imaging position on the basis of the position and speed vector at the current time point and the final target imaging position (S18). That is, from a change in position of the center of gravity between the frames, the work discriminating circuit 363 obtains the estimated time when the position of the center of gravity moves into the predetermined range.

The work discriminating circuit 363 discriminates whether or not the estimated time has reached (S19). At the timing when the estimated time has reached (S19: YES), the work discriminating circuit 363 switches from the first imaging process to the second imaging process and images the work (S20). In the embodiment, the foregoing processes of steps S13 to S19 correspond to the changing-over process (changing-over step). A process of step S20 is similar to step S7 in FIG. 11. A process of next step S21 is also similar to step S8 in FIG. 11.

The processes of steps S18 to S20 are a kind of sub-sampling process that can set the switching time more finely than a frame sampling interval. Thus, the work W that is conveyed at a high speed can be imaged within the predetermined range (target imaging position or it neighborhood) with a high reproducibility.

The partial region $R_{T2}$ including the orbit of the image of the reflected light from the retroreflective member 220, as illustrated in FIG. 14, is a minimum least region that is necessary to obtain the speed vector. While enabling the foregoing sub-sampling process to be realized, the sampling interval itself can be also shortened. Also, in this case, the invention can cope with the work W of a higher speed.

In a manner similar to Modification 2 of the first embodiment, a state when the bright spots exist continuously in the partial region may be used as an evaluation value by using the continuity of the marks. In this case, since there is no need to calculate the center of gravity, the imaging position can be evaluated at a very high speed.

A dynamic obtaining pixel deciding method of deciding the next obtaining pixel by the acquired speed vector can be also used. That is, it is a method whereby a region where the work moves by the next sampling is estimated and the pixel is obtained. In this case, the sampling rate can be further raised. In the embodiment, since the arithmetic operation between the frames is a process of a low arithmetic operation load such as a binarization detection of the center of gravity, or the like, by using the retroreflective members, such a process can be accomplished.

Third Embodiment

Subsequently, an imaging apparatus (imaging method) according to the third embodiment of the invention will be described. The imaging apparatus of the third embodiment has a construction similar to that of the imaging apparatus described in the first embodiment.

Figure 15A:
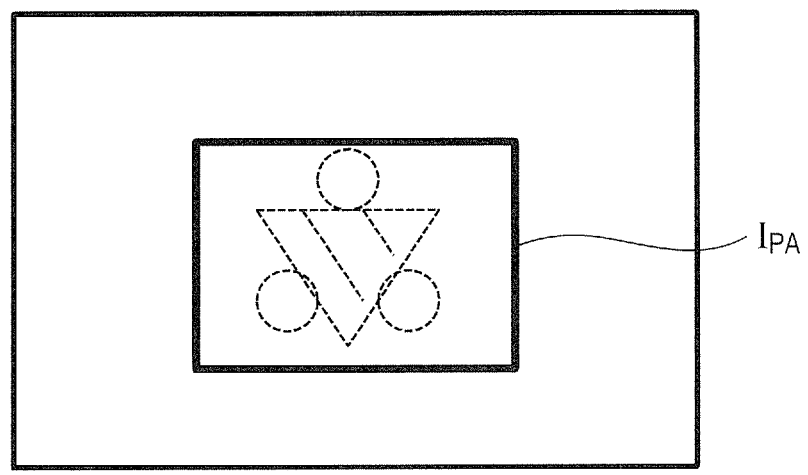
FIGS. 15A and 15B are schematic diagrams each illustrating a partial image that is output to an image processing apparatus in an image that was acquired by imaging and to which a work imaged by an imaging apparatus according to the third embodiment was projected.
Figure 15B:
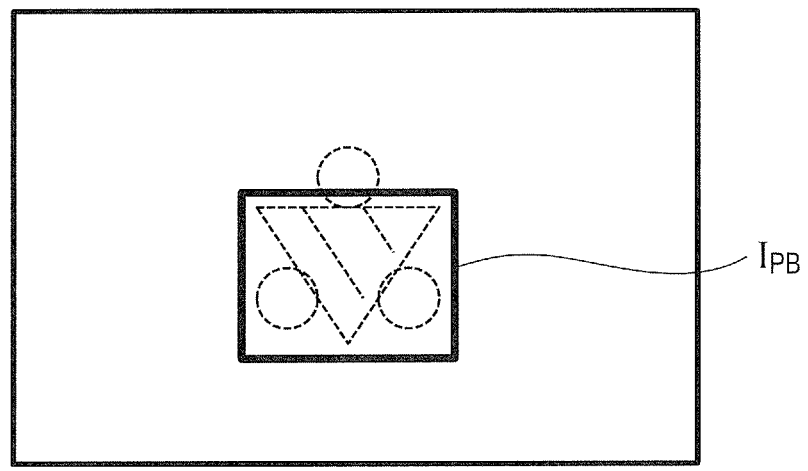

FIGS. 15A and 15B are schematic diagrams each illustrating a partial image that is output to the image processing apparatus in an image that was acquired by imaging and to which a work imaged by the imaging apparatus according to the third embodiment was projected.

Although the first and second embodiments have been described with respect to a case when the image data of all pixels of the image acquired by imaging the work W is output, in the third embodiment, a partial image obtained by cutting out a portion to which the work W has been projected in the image acquired by imaging is output to the image processing apparatus 400. That is, in step S8 in FIG. 11 or in step S21 in FIG. 13, the external outputting circuit 362 outputs a partial image $I_{PA}$ illustrated in FIG. 15A or a partial image $I_{PB}$ illustrated in FIG. 15B in the image that was acquired by imaging and to which the work was projected.

In the case of FIG. 15A, the partial image (external output range) $I_{PA}$ is set so as to have a slight margin in consideration of the work. Thus, a transfer time of the image data is shortened and a throughput is improved.

In the case of FIG. 15B, the further narrowed partial image (external output range) $I_{PB}$ is set by using such a point that the position and orientation of the work at the time of imaging can be estimated for a short time by using the retroreflective member. Thus, even if there is an error every time, it is sufficient to output the image data of the smaller number of pixels, and the transfer time can be further shortened. For example, in the case of the example of FIG. 15B, the number of pixels whose image data is transferred is equal to almost ⅛ of that in the case of outputting the image data of all pixels.

According to the third embodiment mentioned above, in a manner similar to the first and second embodiments, by detecting the position of the mark, the work position can be estimated at a high speed. In addition to it, according to the third embodiment, since it can cope with the work that moves at a higher speed, the throughput can be improved.

Fourth Embodiment

Subsequently, a production system according to the fourth embodiment of the invention will be described. The first embodiment has been described with respect to the case when the three retroreflective members 220 are provided for the robot 200. However, the invention is not limited to such an example, but it is desirable to provide three or more retroreflective members. The fourth embodiment will be described with respect to the case when, for example, five retroreflective members are provided.

Figure 16:
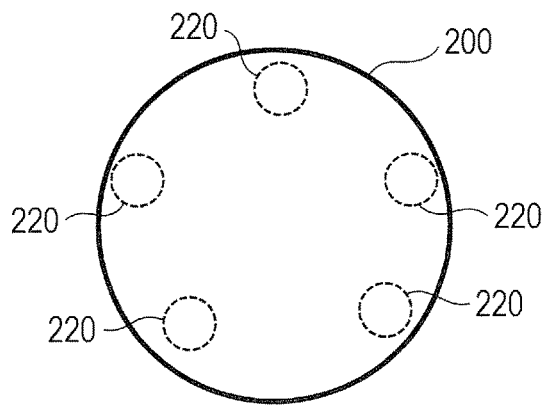
FIG. 16 is a schematic diagram illustrating a case when five retroreflective members are arranged to a robot in the fourth embodiment.

FIG. 16 is a schematic diagram illustrating a case when five retroreflective members (marks) 220 are arranged to the robot 200 in the fourth embodiment. In FIG. 16, portions shown by broken lines are the retroreflective members 220 and are arranged in such a manner that three or more retroreflective members are not aligned on a straight line when seen from the camera 300. By arranging them as mentioned above, even if a striation (that is, light strip) by the light source 322 appears in the image acquired by imaging in dependence on the state of the work W, the timing for imaging the work W can be detected.

Figure 17A:
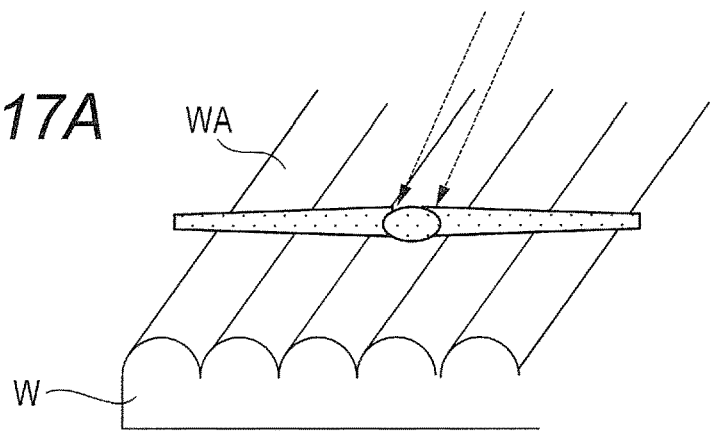
FIG. 17A is an explanatory diagram illustrating a cross-sectional shape of a cutting pattern that is caused when a metal plate has been cut and illustrating a striation that is caused when the light of the second light source has been irradiated to the surface of the metal plate.

A striation phenomenon will now be described. FIG. 17A is an explanatory diagram illustrating a cross-sectional shape of a cutting pattern that is caused when a metal plate has been cut and illustrating a striation that is caused when the light of the light source 322 has been irradiated to the surface of the metal plate. In the cutting work, there is a case when the cutting pattern as illustrated in FIG. 17A is formed on a surface WA of the work W in accordance with a shape of a cutting tool. A shape of the cutting pattern is often a convex shape having a predetermined curvature.

Figure 17B:
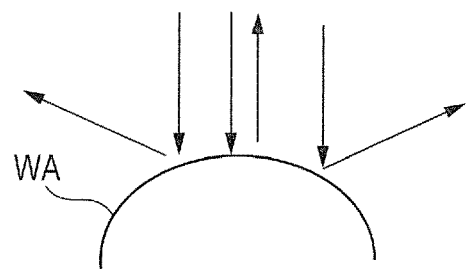
FIG. 17B is a diagram for explaining a principle in which the striation occurs.

FIG. 17B is a diagram for explaining a principle in which the striation occurs. When the cutting pattern is large, if the light from the light source 322 is irradiated, the light is scattered owing to an effect of a convex mirror as illustrated in FIG. 17B. Now, assuming that a singular spot that causes a regular reflection is set to a center, strips of the light are imaged by the camera in the cutting pattern and on both sides or one side in the vertical direction. Such a phenomenon is called a striation phenomenon. When the striation phenomenon occurs, since its brightness is equal to or higher than that of the image of the retroreflective member, the reflected light of the retroreflective member 220 under the striation cannot be distinguished.

Figure 17C:
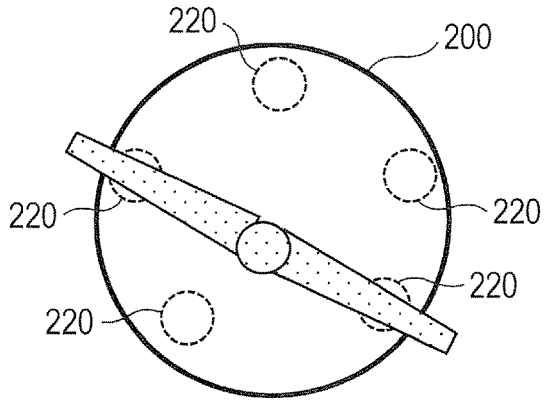
FIG. 17C is a schematic diagram illustrating a state when the striation occurred.

FIG. 17C is a schematic diagram illustrating a state when the striation occurred. In the case when the five retroreflective members 220 are arranged in such a manner that three or more of them are not aligned on a straight line, as illustrated in FIG. 17C, even if the striation occurred, the reflected light of at least the one retroreflective member 220 can be detected. Therefore, for example, even if the striation appeared at two positions, the correct imaging position can be detected by using the images of the remaining reflected light. Consequently, the evaluation value (position of the center of gravity) of the work W can be more accurately obtained and the imaging timing can be correctly determined.

Even if there are spots that are regularly reflected by the light source 322 due to a stereoscopic shape besides the singular spot and the striation, they can be separated by a positional relation among a plurality of retroreflective members 220.

Although each of the retroreflective members (marks) 220 has the same shape in FIG. 16, each mark can be identified by changing the shape or color. By using such a method, the invention can certainly cope with various kinds of disturbance. That is, when the position of the work is discriminated, since the retroreflective members 220 on the imaging surface are arranged in a plane manner at the positions where their positional relation, shapes, and colors are already well-known, the positions of the retroreflective members 220 can be accurately specified.

As mentioned above, in the fourth embodiment, even if the striation was projected to the image acquired by imaging, the minimal retroreflective member 220 can be found out irrespective of the state of the work W, so that a mistake of the imaging operation can be reduced.

The invention is not limited to the embodiments described above, but many modifications are possible within a technical idea of the invention. The effects disclosed in the embodiments of the invention are nothing but the most suitable effect obtained by the invention. The effects of the invention are not limited to those disclosed in the embodiments of the invention.

According to the invention, if the arithmetic operating speed does not cause any problem, the circuits for realizing one or more of the functions of the foregoing embodiments may be replaced by a CPU for executing a program. At this time, it can be realized by such processes that the program is supplied to a system or an apparatus through a network or a storage medium, and one or more of processors in a computer of the system or apparatus reads out and executes the program.

Although the foregoing embodiments have been described with respect to the case when the retroreflective member, is used as a mark, the mark is not limited to the retroreflective member but a simple reflecting member may be used. In this case, it is sufficient to move the second light source or the imaging unit synchronously with the conveying apparatus in such a manner that the reflected light from the mark enters the imaging unit. In this case, since a moving apparatus for moving the second light source or the imaging unit is necessary, in the foregoing embodiments, by using the retroreflective member as a mark, there is no need to move the second light source and the imaging unit. That is, the moving apparatus can be omitted.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
   (A) an imaging unit that executes imaging operations;
   (B) an illuminating unit, wherein the illuminating unit has a first light source having a certain opening and a second light source having an opening smaller than that of the first light source; and (C) a controlling unit configured to control the imaging unit and the illuminating unit, wherein the controlling unit executes:
  (a) a first imaging process for obtaining a first image including an object moving together with a retroreflective mark, by causing the imaging unit to repetitively execute an imaging operation in a state in which the first light source is lit off and the second light source is lit on,
  (b) a second imaging process for obtaining a second image including the object, by causing the imaging unit to execute an imaging operation in a state in which the first light source is lit on, and
  (c) a changing-over process for setting a timing for switching from the first imaging process to the second imaging process, on the basis of a position of the retroreflective mark included in the first image.

2. An imaging apparatus according to claim 1, wherein the second light source is arranged near the imaging unit so that the reflected light from the retroreflective mark enters the imaging unit.

3. An imaging apparatus according to claim 1, wherein, in the first imaging process, the controlling unit obtains a pixel in only a partial region in the image acquired by the imaging.

4. An imaging apparatus according to claim 1, wherein, in the changing-over process, as an evaluation value, the controlling unit obtains a position of a center of gravity of a pixel brighter than a predetermined luminance, and when the position of the center of gravity lies within a predetermined range, the controlling unit switches from the first imaging process to the second imaging process.

5. An imaging apparatus according to claim 1, wherein, in the changing-over process, as an evaluation value, the controlling unit obtains a position of a center of gravity of a pixel brighter than a predetermined luminance and obtains an estimated time when the position of the center of gravity moves into a predetermined range on the basis of a change of the position of the center of gravity between frames, and the controlling unit switches from the first imaging process to the second imaging process at a timing when the estimated time is reached.

6. An imaging apparatus according to claim 1, wherein, in the changing-over process, as an evaluation value, the controlling unit obtains an arithmetic operation value acquired by dividing a sum of values obtained by multiplying coordinate values of the pixel by a luminance by a sum of luminances of the pixels, and, when the arithmetic operation value lies within a predetermined range, the controlling unit switches from the first imaging process to the second imaging process.

7. An imaging apparatus according to claim 1, wherein, in the changing-over process, as an evaluation value, the controlling unit obtains an area of continuous pixels that are brighter than a predetermined luminance, and, when the area lies within a predetermined range, the controlling unit switches from the first imaging process to the second imaging process.

8. An imaging apparatus according to claim 1, wherein the controlling unit further executes an outputting process for outputting the image, acquired by imaging by the second imaging process, to an external apparatus.

9. An imaging apparatus according to claim 8, wherein, in the outputting process, the controlling unit outputs a partial image obtained by cutting out a portion, to which the object has been projected, to the external apparatus.

10. An imaging apparatus according to claim 1, wherein an area of the mark is greater than an area of an opening of the second light source.

11. An imaging apparatus according to claim 1, wherein a plurality of marks are provided, and an area of a minimum region, including the plurality of marks, is greater than an area of an opening of the second light source.

12. An imaging apparatus according to claim 1, wherein three or more of the marks are provided, such that reflected light of three or more of the marks are not aligned on a straight line in the image acquired by the imaging operation executed by the imaging unit.

13. A production system comprising:
  an imaging apparatus comprising:
  (A) an imaging unit that executes imaging operations;
  (B) an illuminating unit, wherein the illuminating unit has a first light source having a certain opening and a second light source having an opening smaller than that of the first light source;
  (C) a conveying apparatus for conveying an object; and
  (D) a controlling unit configured to control the imaging unit and the illuminating unit, wherein the controlling unit executes:
    (a) a first imaging process for obtaining a first image including the object moving together with a retroreflective mark, by causing the imaging unit to repetitively execute an imaging operation in a state in which the first light source is lit off and the second light source is lit on during the conveyance of the object by the conveying apparatus,
    (b) a second imaging process for obtaining a second image including the object, by causing the imaging unit to execute an imaging operation in a state in which the first light source is lit on during the conveyance of the object by the conveying apparatus, and
    (c) a changing-over process for setting a timing for switching from the first imaging process to the second imaging process on the basis of a position of the retroreflective mark included in the first image.

14. A production system according to claim 13, wherein the conveying apparatus is a robot that holds and conveys the object.

15. An imaging method of imaging an object moving together with a retroreflective mark, by using an imaging apparatus that comprises an imaging unit, an illuminating unit, and a controlling unit for controlling the imaging unit and the illuminating unit, wherein the illuminating unit comprises a first light source having an opening and a second light source having an opening smaller than the opening of the first light source, the imaging method comprising:
  a first imaging step of allowing the controlling unit to cause the imaging unit to obtain a first image including the retroreflective mark, by causing the imaging unit to repetitively execute an imaging operation in a state in which the first light source is lit off and the second light source is lit on;
  a second imaging step of allowing the controlling unit to cause the imaging unit to obtain a second image including the object, by causing the imaging unit to execute an imaging operation in a state in which the first light source is lit on; and
  a changing-over step for setting a timing for switching from the first imaging step to the second imaging step, on the basis of a position of the retroreflective mark included in the first image.

16. A non-transitory computer-readable storage medium storing a program for causing a computer to execute an imaging method of imaging an object moving together with a retroreflective mark, by using an imaging apparatus that comprises an imaging unit, an illuminating unit, and a controlling unit for controlling the imaging unit and the illuminating unit, wherein the illuminating unit comprises a first light source having an opening and a second light source having an opening smaller than the opening of the first light source, the imaging method comprising:
- a first imaging step of allowing the controlling unit to cause the imaging unit to obtain a first image including the retroreflective mark, by causing the imaging unit to repetitively execute an imaging operation in a state in which the first light source is lit off and the second light source is lit on;
- a second imaging step of allowing the controlling unit to cause the imaging unit to obtain a second image including the object, by causing the imaging unit to execute an imaging operation in a state in which the first light source is lit on; and
- a changing-over step for setting a timing for switching from the first imaging step to the second imaging step, on the basis of a position of the retroreflective mark included in the first image.

17. A production system according to claim 14, wherein
(i) the production system further comprises an image processing apparatus and a robot controlling apparatus,
(ii) the image processing apparatus obtains the second image from the controlling unit, and obtains data of position and orientation of the object in relation to the robot from the second image, and
(iii) the robot controlling apparatus controls an orientation of the robot based on the data obtained by the image processing apparatus.

* * * * *